US011984018B2

United States Patent
Takahashi et al.

(10) Patent No.: US 11,984,018 B2
(45) Date of Patent: May 14, 2024

(54) SENSORY VIBRATION GENERATION APPARATUS AND SENSORY VIBRATION PRODUCING APPARATUS

(71) Applicants: Yuki Takahashi, Tokyo (JP); Yasutaka Kitamura, Tokyo (JP); Tomoya Ishitani, Tokyo (JP)

(72) Inventors: Yuki Takahashi, Tokyo (JP); Yasutaka Kitamura, Tokyo (JP); Tomoya Ishitani, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/780,135

(22) PCT Filed: Nov. 27, 2020

(86) PCT No.: PCT/JP2020/044141
§ 371 (c)(1),
(2) Date: May 26, 2022

(87) PCT Pub. No.: WO2021/107068
PCT Pub. Date: Jun. 3, 2021

(65) Prior Publication Data
US 2022/0415142 A1  Dec. 29, 2022

(30) Foreign Application Priority Data
Nov. 29, 2019  (JP) .................. 2019-217040

(51) Int. Cl.
H04B 3/36      (2006.01)
G08B 6/00      (2006.01)
(52) U.S. Cl.
CPC ...................... G08B 6/00 (2013.01)

(58) Field of Classification Search
CPC ........... G08B 6/00; B06B 1/045; H02K 35/00
See application file for complete search history.

(56) References Cited

U.S. PATENT DOCUMENTS 3,378,732 A * 4/1968 Dietz .................... H01F 7/1607
361/194
3,803,477 A * 4/1974 Kind ...................... H02H 7/125
363/67
(Continued)

FOREIGN PATENT DOCUMENTS

CN   1154236 A      7/1997
JP   01-045192 Y2  12/1989
(Continued)

OTHER PUBLICATIONS

International Search Report of PCT/JP2020/044141 dated Jan. 19, 2021.
Extended European Search Report dated Oct. 23, 2023.

*Primary Examiner* — Toan N Pham
(74) *Attorney, Agent, or Firm* — Shih IP Law Group, PLLC.

(57) ABSTRACT

This bodily vibration generation device can be mounted to a bodily sensation presentation apparatus and generates, with a simple configuration, suitable vibration corresponding to a sound so that a user bodily senses the vibration. This device has: an electromagnetic actuator that causes, by an inputted drive signal, a movable body being supported so as to be elastically vibratable with respect to a fixed body, to vibrate by driving same in one direction of the vibration directions thereof; an AC signal input unit for inputting an AC signal; and a rectification unit that performs half-wave rectification of the AC signal and outputs the AC signal to the electromagnetic actuator as the drive signal.

8 Claims, 15 Drawing Sheets

(56) References Cited

U.S. PATENT DOCUMENTS

| | | | |
|---|---|---|---|
| 4,105,024 A | 8/1978 | Raffel | |
| 4,697,581 A | 10/1987 | Endo | |
| 4,710,655 A | 12/1987 | Masaki | |
| 9,355,536 B2 * | 5/2016 | Crawley | ............... B06B 1/0246 |
| 2011/0063057 A1 * | 3/2011 | Takahashi | .............. H02K 35/04 |
| | | | 335/207 |
| 2019/0146586 A1 * | 5/2019 | Yamamoto | .............. G06F 3/016 |
| | | | 345/174 |
| 2019/0304650 A1 | 10/2019 | Takahashi | |

FOREIGN PATENT DOCUMENTS

| | | |
|---|---|---|
| JP | 03-283999 A | 12/1991 |
| JP | 07-245793 A | 9/1995 |
| JP | 2000-014190 A | 1/2000 |
| JP | 2012-050003 A | 3/2012 |
| JP | 2019-180168 A | 10/2019 |

* cited by examiner

SENSORY VIBRATION GENERATION APPARATUS AND SENSORY VIBRATION PRODUCING APPARATUS

TECHNICAL FIELD

The present invention relates to a sensory vibration generation apparatus that provides a feeling to a user through vibration, and a sensory vibration producing apparatus including the sensory vibration generation apparatus.

BACKGROUND ART

In the related art, technology has been considered to convert the sound heard through speakers, earphones, etc., into electrical sound signals, and to use a vibrator that generates vibrations by means of the sound signals such that it can be experienced on the body or other parts of the body other than the ears.

For example, PTL 1 discloses a simple-worn sensory vibration apparatus in which an electrical-mechanical vibration transducer that vibrates in response to an electrically-converted voice signal in the audible range is built into a bag that is nearly attached to the body via a belt. In the electrical-mechanical vibration transducer in PTL 1, an annular magnet with an annular yoke stretched on one side is suspended via a plate damper at the top of the inner circumference of the case. On the other side of the magnet is a convex yoke, the convex part of which is inserted into the inner hole of the magnet with a gap. A coil is inserted into the gap between the convex part of the inner hole of the magnet and the inner hole of the magnet, and the coil is mounted in the center of the lid that seals the case. The electrical-mechanical vibration transducer is input with a voice signal that is processed by applying a low-pass filter to the voice, or a voice signal in which a single frequency in the low frequency range is modulated by an envelope signal that communicates the amplitude height of the voice. The input speech signal causes a signal current to flow through the coil, and the electrical-mechanical vibration transducer generates vibration along the waveform of the speech signal.

CITATION LIST

Patent Literature

PTL 1
Japanese Patent Application Laid-Open No. H7-245793

SUMMARY OF INVENTION

Technical Problem

Incidentally, as a vibration apparatus that generates vibration in response to sound, it is desired to use an electromagnetic actuator driven in one direction to generate suitable vibration with a simpler configuration than in PTL 1.

An object of the present invention is to provide a sensory vibration generation apparatus and a sensory vibration producing apparatus that can generate a suitable vibration corresponding to a sound and make the user feel it with a simple configuration.

Solution to Problem

A sensory vibration generation apparatus according to an embodiment of the present invention includes: an electromagnetic actuator configured to vibrate a movable member by driving the movable member in one direction of a vibration direction of the movable member with an input driving signal, the movable member being supported to elastically vibrate with respect to a fixing body; an alternating current signal input section to which an alternating current signal is input; and a rectification section configured to acquire the driving signal by performing half-wave rectification on the alternating current signal and output the driving signal to the electromagnetic actuator.

A sensory vibration producing apparatus according to an embodiment of the present invention includes: the sensory vibration generation apparatus; and a vibration transmission part configured to be vibrated by the sensory vibration generation apparatus to transmit a vibration to a user.

Advantageous Effects of Invention

According to the present invention, it is possible to make the user feel a suitable vibration corresponding to a sound with a simple configuration.

DESCRIPTION OF EMBODIMENTS

An embodiment of the present invention is elaborated below with reference to the accompanying drawings.

The present embodiment will be described using an orthogonal coordinate system (X, Y, Z). The drawings described below are also uses the common orthogonal coordinate system (X, Y, Z). In the following description, the width, depth, and height of vibration producing apparatus (sensory vibration producing apparatus) 200 including a sensory vibration generation apparatus are the lengths in the X direction, the Y direction, and the Z direction, respectively. The width, depth, and height of electromagnetic actuator 10 are also the lengths in X direction, the Y direction, and the Z direction, respectively. The plus side in the Z direction is the direction of the vibration provided to the user (the part to which vibration is performed) and is referred to as "upper side," and the minus side in the Z direction is the direction away from the user and is referred to as "lower side".

General Configuration of Vibration Producing Apparatus 200 Including Sensory Vibration Generation Apparatus 100

Figure 1:
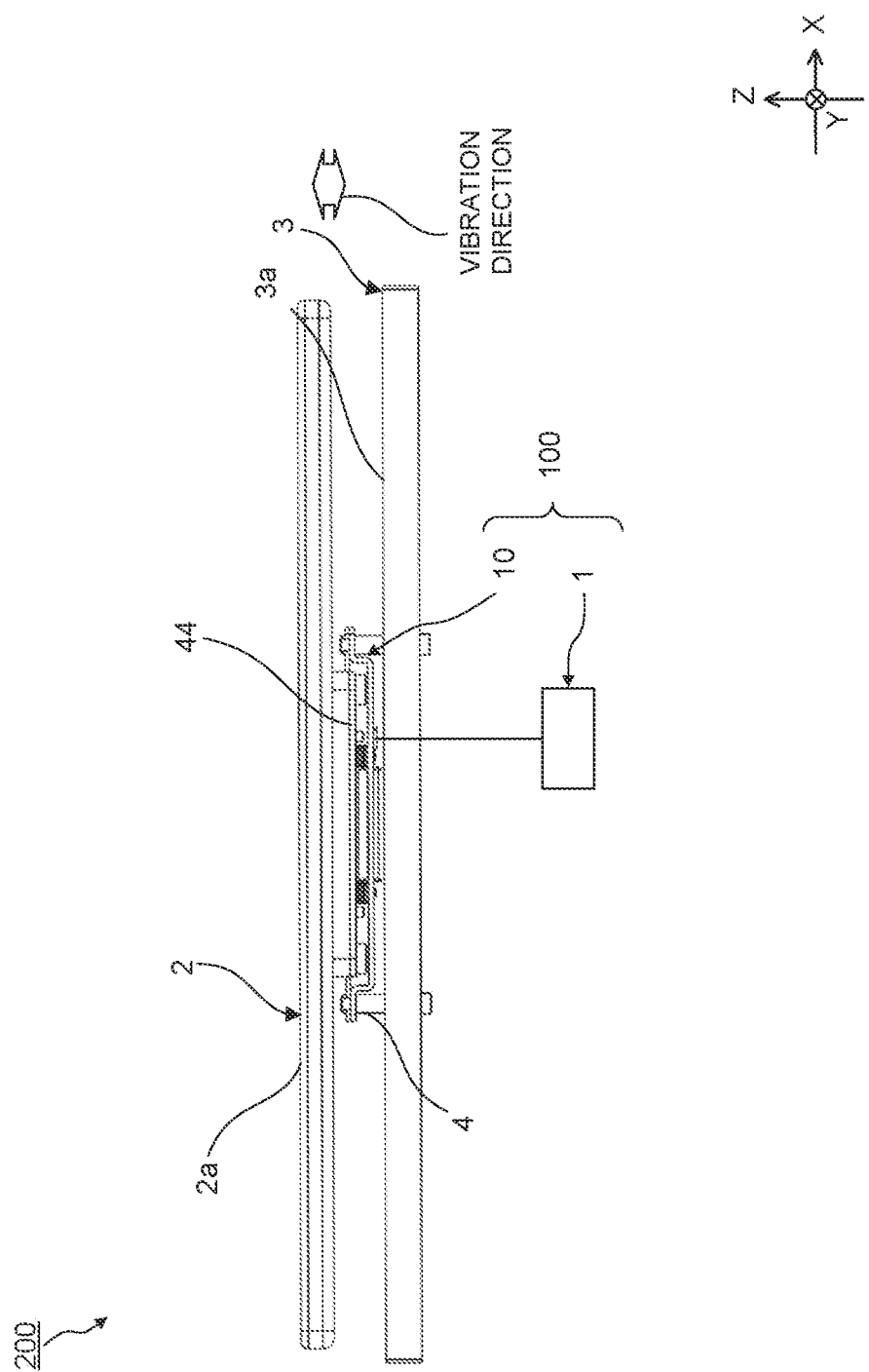
FIG. 1 is a side view illustrating a vibration producing apparatus including a sensory vibration generation apparatus according to an embodiment of the present invention.
Figure 2:
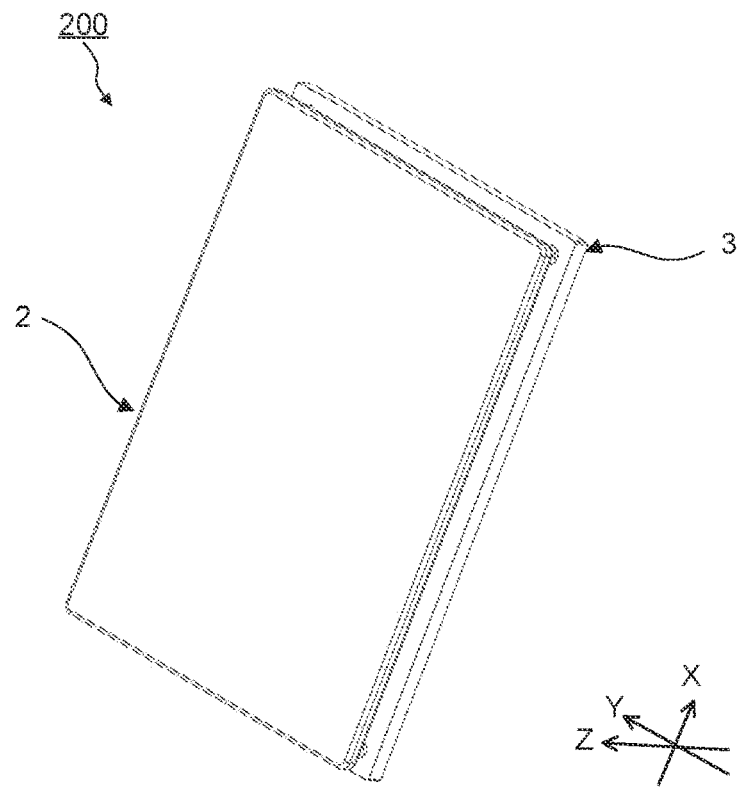
FIG. 2 is a perspective view illustrating an external appearance of the vibration producing apparatus including the sensory vibration generation apparatus according to the embodiment of the present invention.

Vibration producing apparatus 200 illustrated in FIG. 1 and FIG. 2 includes sensory vibration generation apparatus 100 including electromagnetic actuator 10, and vibration transmission part 2 that provides the vibration generated by sensory vibration generation apparatus 100 to the user to make the user feel the vibration. Vibration producing apparatus 200 provides the vibration corresponding to the input alternating current signal to the user by using sensory vibration generation apparatus 100. For example, sensory vibration generation apparatus 100 is used for game machines (for example, game controller 300 illustrated in FIG. 17 and game seat 400 illustrated in FIG. 18) and the like. In addition, vibration producing apparatus 200 may be used for game controller 300 or game seat 400 to provide the user of game controller 300 and game seat 400 with a vibration in synchronization with an alternating current signal of a sound through vibration transmission part 2, for example.

In vibration producing apparatus 200 illustrated in FIG. 1 and FIG. 2, electromagnetic actuator 10 of sensory vibration generation apparatus 100 is disposed between vibration transmission part 2 and base 3 serving as the apparatus's rear part disposed on the rear surface side of vibration transmission part 2.

Figure 3:
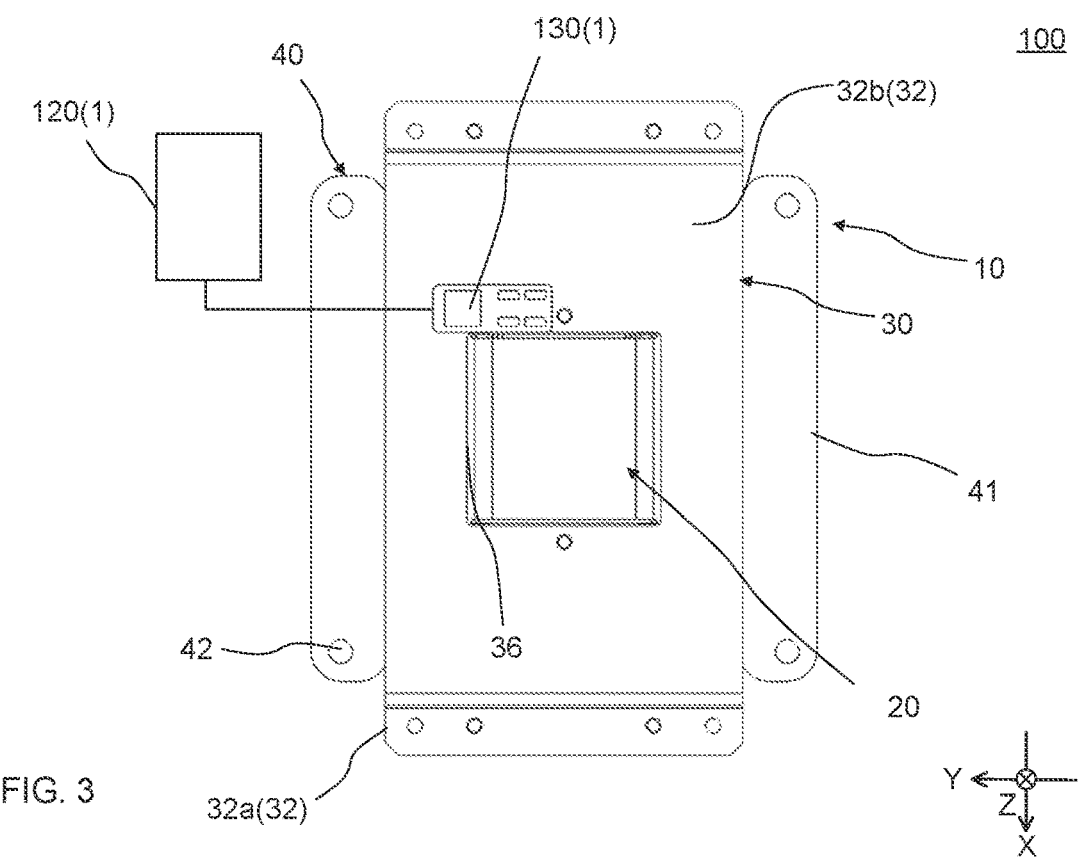
FIG. 3 is a rear view of the sensory vibration generation apparatus according to the embodiment of the present invention.

On the rear surface side, vibration transmission part 2 is fixed to surface fixing part 44 of movable member 40 of electromagnetic actuator 10 (see FIG. 3). In addition, base 3 is disposed to face vibration transmission part 2 and the fixing body of electromagnetic actuator 10 is fixed to base 3 through leg part 4. In this manner, electromagnetic actuator 10 is disposed between the center portion of base 3 and vibration transmission part 2 to connect therebetween.

Figure 5:
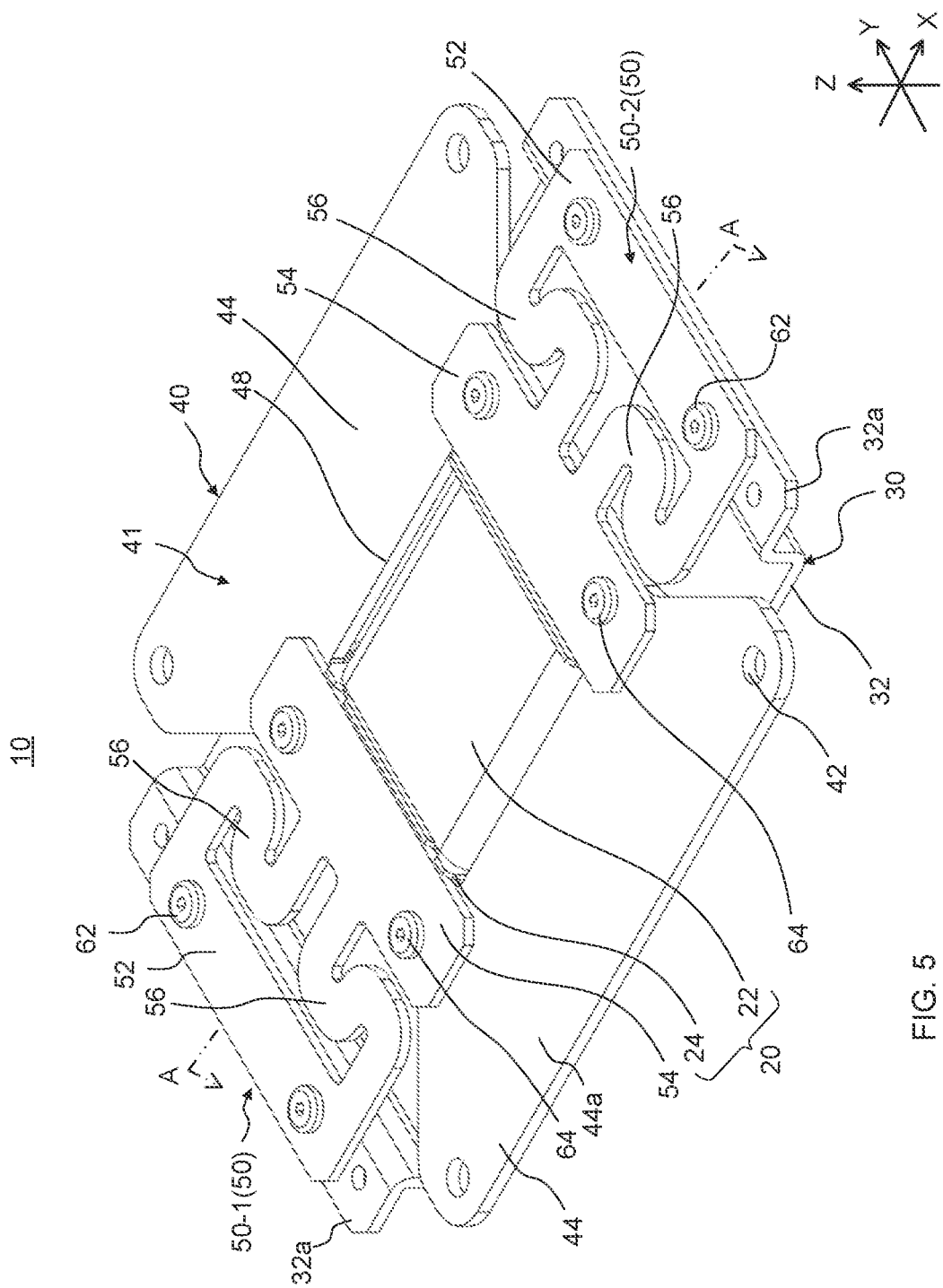
FIG. 5 is a perspective plan view of an external appearance of an electromagnetic actuator provided in the sensory vibration generation apparatus.
Figure 6:
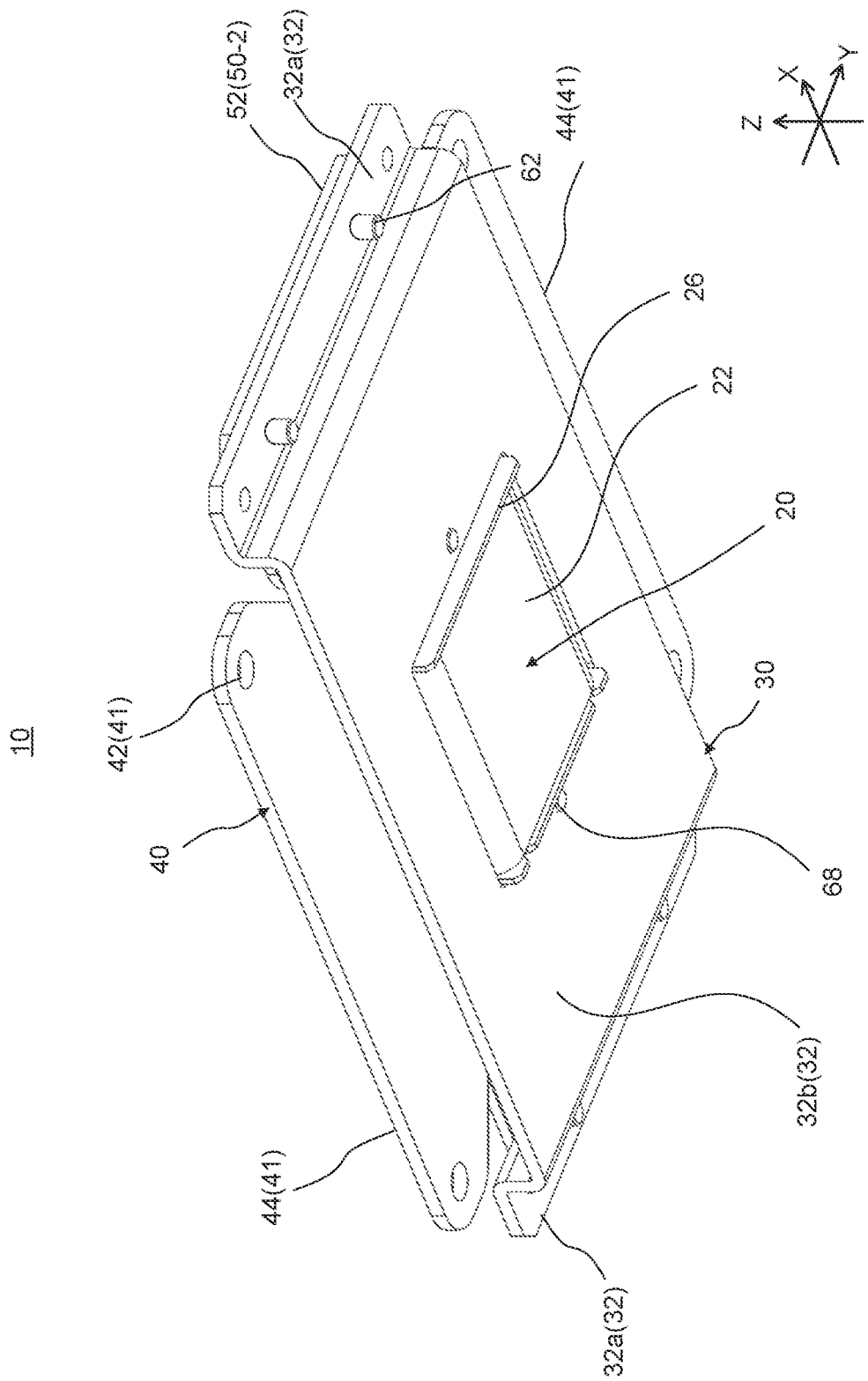
FIG. 6 is a perspective view illustrating an external appearance on the back side of the same electromagnetic actuator.

Vibration transmission part 2 is driven integrally with movable member 40 of electromagnetic actuator 10 (see FIGS. 5 and 6). When the body of the user (such as the finger, hand, extremities, and trunk) is placed on surface 2a, the vibration direction of movable member 40 in electromagnetic actuator 10 is preferably the direction perpendicular to surface 2a (the direction at a right angle to surface 2a). In the present embodiment, the Z direction, which is the vibration direction of movable member 40 in electromagnetic actuator 10, is the same direction as the direction perpendicular to surface 2a. In this manner, electromagnetic actuator 10 can directly drive vibration transmission part 2 with a stronger vibration in comparison with the vibration direction is different from the direction perpendicular to surface 2a. In the present embodiment, the user can be made strongly feel the vibration corresponding to the audio (sound) source and the like.

Thus, in the case where a vibration can be transmitted to the user through vibration transmission part 2 such as when the user makes contact with vibration transmission part 2, the vibration corresponding to the audio source can be provided by moving movable member 40. Note that while vibration transmission part 2 is formed in a rectangular plate shape in the present embodiment, this is not limitative, and any configuration may be employed as long as the vibration can be provided to the touching user. Vibration transmission part 2 may be composed of a plurality of materials or members.

Sensory Vibration Generation Apparatus 100

Sensory vibration generation apparatus 100 performs half-wave rectification of an input alternating current signal (for example, an alternating current signal as an audio source), and outputs it as a driving signal to electromagnetic actuator 10. In this manner, sensory vibration generation apparatus 100 causes electromagnetic actuator 10 to drive in synchronization with the input of the alternating current signal to sensory vibration generation apparatus 100.

Figure 4:
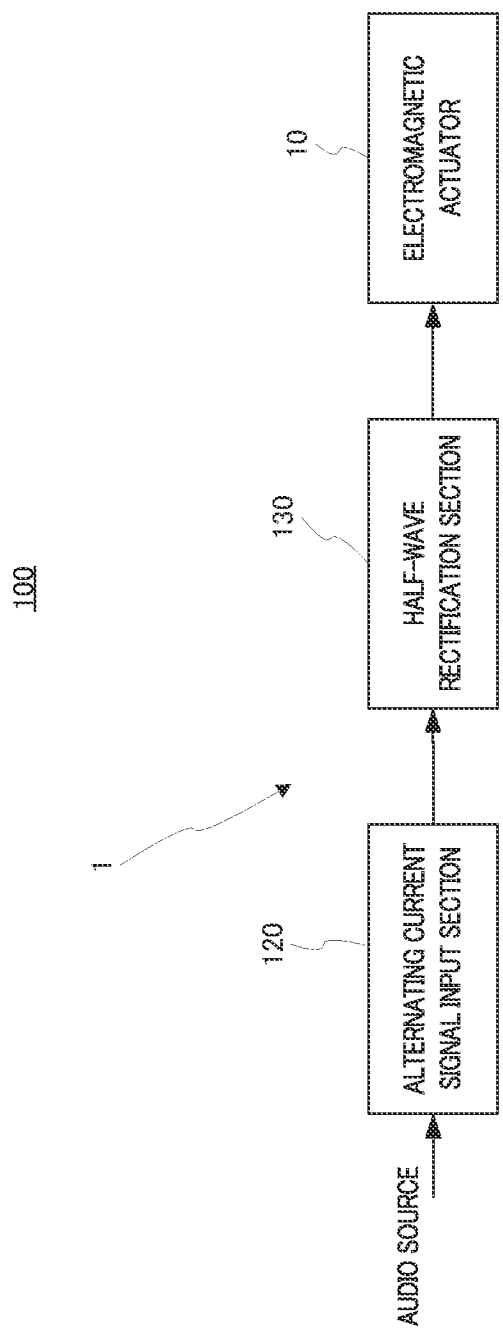
FIG. 4 is a block diagram illustrating a configuration of a main part of the sensory vibration generation apparatus according to the embodiment of the present invention.

Sensory vibration generation apparatus 100 illustrated in FIGS. 1, 3, and 4 includes electromagnetic actuator 10 that drives in one direction, alternating current signal input section 120, and half-wave rectification section 130. Note that alternating current signal input section 120 and half-wave rectification section 130 are described as a part of control section 1 in the present embodiment. The driving in one direction means driving a movable member, which is supported movably in the vibration direction through an elastic body with respect to a fixing body, in one direction (a single direction) in the vibration direction by exciting the coil so as to drive it by returning (restoring) it with the biasing force of the elastic body. Electromagnetic actuator 10 of the present embodiment is configured to drive a movable member that moves back and forth along a straight line in one direction (one of the directions) of the straight line, and return it in the other direction opposite to the one direction of the straight line with the biasing force of the elastic body. The electromagnetic actuator may have any configuration as long as it drives the movable member in one direction. First, electromagnetic actuator 10 as an example of the electromagnetic actuator provided in sensory vibration generation apparatus 100 is described below.

Configuration of Electromagnetic Actuator 10

Figure 7:
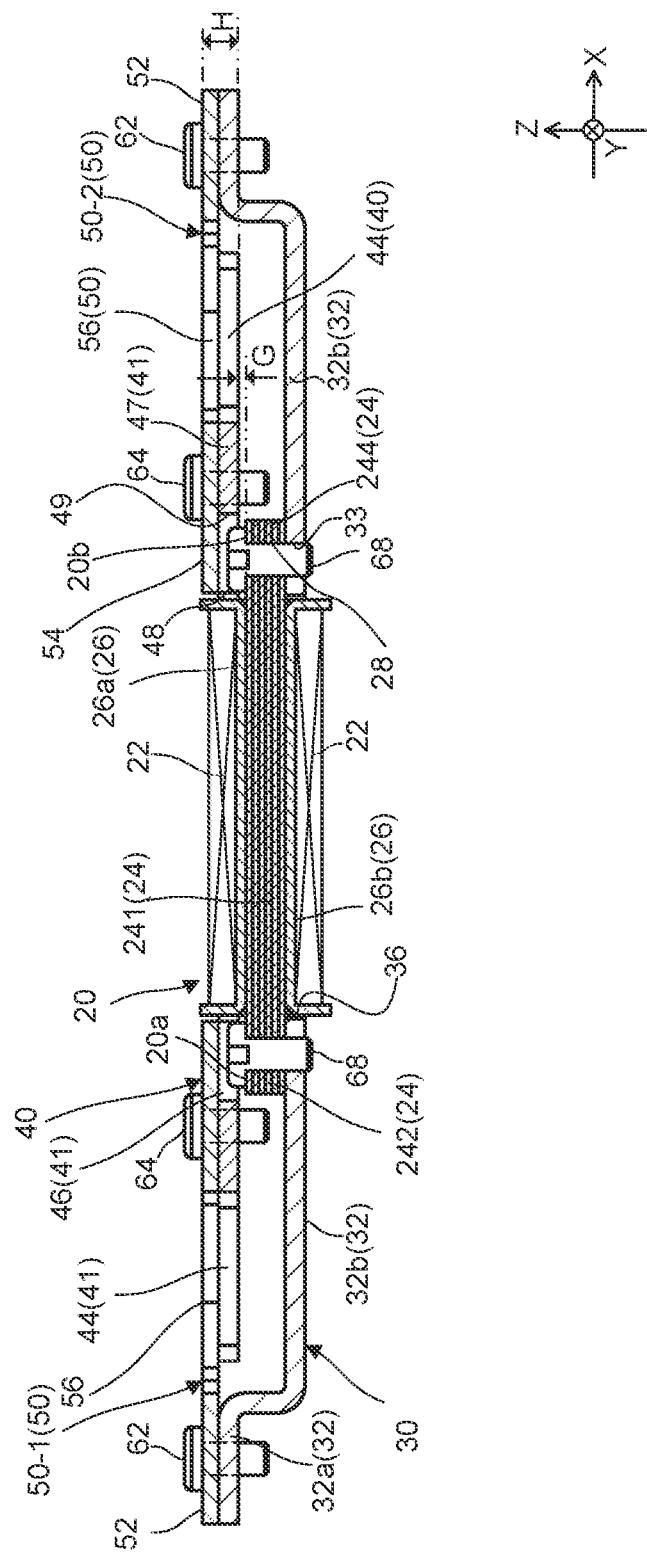
FIG. 7 is a sectional view taken along of line A-A of FIG. 5.
Figure 8:
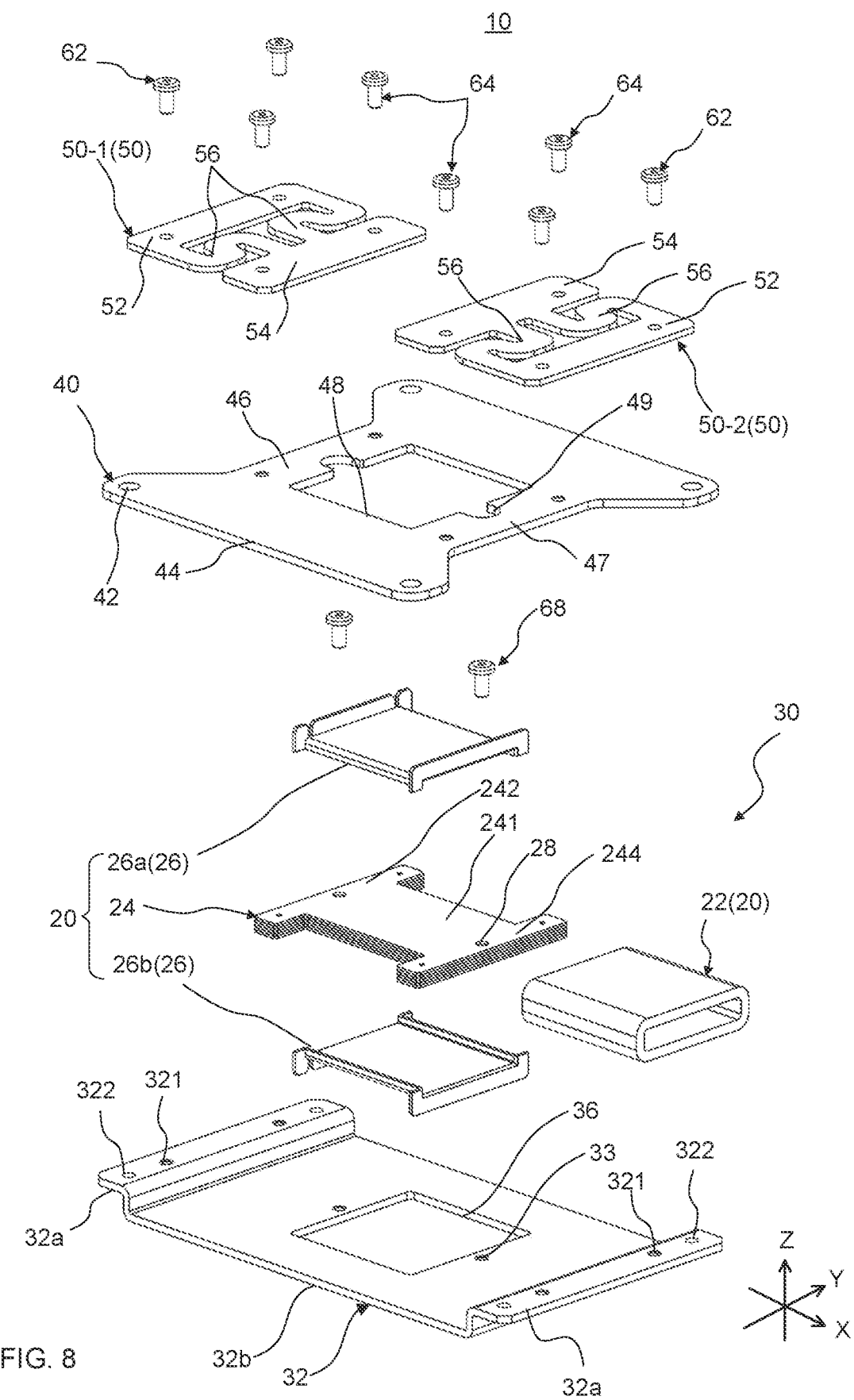
FIG. 8 is an exploded perspective view of the same electromagnetic actuator.

FIG. 5 is a plan perspective view of an external appearance of electromagnetic actuator 10 of sensory vibration generation apparatus 100 according to the embodiment of the present invention, and FIG. 6 is a bottom perspective view of an external appearance of the same electromagnetic actuator 10. In addition, FIG. 7 is a sectional view taken along line A-A of FIG. 5, and FIG. 8 is an exploded perspective view of electromagnetic actuator 10.

Electromagnetic actuator 10 illustrated in FIG. 5 to FIG. 8 functions as a vibration generation source of vibration transmission part 2.

Electromagnetic actuator 10 includes fixing body 30, and movable member 40 fixed to vibration transmission part 2 and supported such that it can elastically vibrate with respect to fixing body 30. Electromagnetic actuator 10 linearly moves back and forth (which includes vibration) movable member 40 by driving movable member 40 in one direction and moving movable member 40 in the direction opposite to the one direction (opposite direction of the one direction) with a biasing force of a member (resilient part 50) that generates a biasing force.

Electromagnetic actuator 10 transmits an alternating current signal input to sensory vibration generation apparatus 100, such as a vibration corresponding to an audio source, to the user of vibration transmission part 2 (for example, the user who makes contact with the vibration transmission part 2), to make the user feel it, for example.

Electromagnetic actuator 10 includes fixing body 30 including core assembly 20 composed of coil 22 wound around core 24 and base part 32, movable member 40 including magnetic substance yoke 41, and resilient part 50 (50-1, 50-2) that elastically supports movable member 40 such that it is movable in the vibration direction with respect to fixing body 30.

Electromagnetic actuator 10 drives and moves movable member 40 movably supported at resilient part 50 in one direction with respect to fixing body 30. In addition, movable member 40 is moved in the direction opposite to the one direction with the biasing force of resilient part 50.

With core assembly 20, electromagnetic actuator 10 vibrates yoke 41 of movable member 40. More specifically, with the attraction force of core 24 excited by energized coil 22 and the biasing force of resilient part 50 (50-1, 50-2), movable member 40 is vibrated. In the present embodiment, electromagnetic actuator 10 is driven through an operation of the electromagnet.

Electromagnetic actuator 10 is configured in a flat shape with the Z direction as its thickness direction. Electromagnetic actuator 10 vibrates movable member 40 with respect to fixing body 30 in the Z direction, i.e., the thickness direction, as the vibration direction. In movable member 40, one of front and rear surfaces disposed away from each other in the thickness direction of electromagnetic actuator 10 itself is moved closer and separated with respect to the other surface in the Z direction.

In the present embodiment, electromagnetic actuator 10 moves movable member 40 in the minus Z direction as one direction with the attraction force of core 24, and moves movable member 40 in the plus Z direction with the biasing force of resilient part 50 (50-1, 50-2).

In electromagnetic actuator 10 of the present embodiment, movable member 40 is elastically supported with a plurality of resilient parts 50 (50-1, 50-2) disposed along the direction orthogonal to the Z direction at a point symmetrical position with respect to the movable center of movable member 40, but this configuration is not limitative.

Fixing Body 30

As illustrated in FIG. 7 and FIG. 8, fixing body 30 includes core assembly 20 including coil 22 and core 24, and base part 32.

Base part 32, to which core assembly 20 is fixed, supports movable member 40 such that movable member 40 is freely vibrated through resilient part 50 (50-1, 50-2). Base part 32 is a flat shaped member, and forms the bottom surface of electromagnetic actuator 10. Base part 32 includes attaching portion 32a to which one end portion of resilient part 50 (50-1, 50-2) is fixed, so as to sandwich core assembly 20 in the X direction. Attaching portions 32a are disposed with the same distance from core assembly 20. Note that the distance is a distance serving as the deformation region of resilient part 50 (50-1, 50-2).

As illustrated in FIG. 8, attaching portion 32a includes fixation hole 321 for fixing resilient part 50 (50-1, 50-2), and fixation hole 322 for fixing base part 32 to base 3 (see FIG. 1). Fixation hole 322 is disposed at both end portions of attaching portion 32a to sandwich fixation hole 321 in the depth direction (Y direction), and is fixed to base 3 through cylindrical leg part 4 (see FIG. 1) as illustrated in FIG. 1. In this manner, base part 32 is entirely stably fixed to base 3 (see FIG. 1).

In the present embodiment, base part 32 is configured by processing a sheet metal such that the other side portion and one side portion serving as attaching portion 32a sandwich bottom surface part 32b, with a distance therebetween in the width direction (X direction). A recessed part including bottom surface part 32b with a height lower than attaching portion 32a is provided between attaching portions 32a. In the recessed part, i.e., the space on the surface side of bottom surface part 32b is a space for ensuring the elastic deformation region of resilient part 50 (50-1, 50-2) and ensuring the movable region of movable member 40 supported by resilient part 50 (50-1, 50-2).

Bottom surface part 32b has a rectangular shape, opening 36 is formed at its center portion, and core assembly 20 is located inside opening 36.

Core assembly 20 is fixed inside opening 36 in a partially inserted state. More specifically, divided member 26b of bobbin 26 on the lower side of core assembly 20 and the lower portion of coil 22 are inserted inside opening 36, and fixed such that core 24 is located on bottom surface part 32b in side view. In this manner, in comparison with the configuration in which core assembly 20 is attached on bottom surface part 32b, the length (thickness) in the Z direction is small. In addition, a part of core assembly 20, in this case, a part on the bottom surface side, is fixed and fitted inside opening 36, and thus core assembly 20 is firmly fixed in the state where it is less easily removed from bottom surface part 32b.

Opening 36 has a shape matching the shape of core assembly 20. In the present embodiment, opening 36 is formed in a square shape. In this manner, core assembly 20 and movable member 40 can be disposed at a center portion of electromagnetic actuator 10 such that the entire electromagnetic actuator 10 has a substantially square shape in plan view. Note that opening 36 may have a rectangular shape (including a square shape).

In conjunction with resilient part 50 (50-1, 50-2), core assembly 20 vibrates (linearly moves back and forth in the Z direction) yoke 41 of movable member 40.

In the present embodiment, core assembly 20 is formed in a rectangular plate shape. Magnetic pole parts 242 and 244 are disposed at both sides of the rectangular plate shape in the longitudinal direction. Magnetic pole parts 242 and 244 are disposed to face the bottom surfaces of attracted surface parts 46 and 47 of movable member 40 with gap G (see FIG. 7) in the X direction. At opposing surfaces (opposing surface parts) 20a and 20b as the top surfaces, magnetic pole parts 242 and 244 face the bottom surfaces (i.e., a part of the bottom surfaces) of attracted surface parts 46 and 47 of yoke 41 in the vibration direction of movable member 40.

In the present embodiment, core assembly 20 is formed in a rectangular plate shape, and includes magnetic pole parts 242 and 244 at the both sides in the longitudinal direction.

Core assembly 20 is configured with coil 22 wound around the outer periphery of core 24 through bobbin 26. As illustrated in FIG. 7 and FIG. 8, core assembly 20 is fixed to base part 32 with the winding axis of coil 22 oriented toward the opposing direction of attaching portions 32a separated in base part 32. In the present embodiment, core assembly 20 is disposed at a center portion of base part 32, or more specifically, at a center portion of bottom surface part 32b.

As illustrated in FIG. 7, core assembly 20 is fixed to bottom surface part 32b such that it is in parallel to bottom surface part 32b of core 24, across opening 36 on the bottom surface. With screw 68 (see FIGS. 6 to 8) serving as a securing member, core assembly 20 is fixed with coil 22 and the portion (core main body 241) wound around coil 22 are located inside opening 36 of base part 32.

More specifically, to bottom surface part 32b, core assembly 20 is fixed with coil 22 disposed in opening 36 by fastening screw 68 through fixation hole 28 and securing hole 33 of bottom surface part 32b (see FIGS. 6 and 7). Core assembly 20 and bottom surface part 32b are joined with screw 68 at two portions on the axial center of coil 22 by both sides of opening 36 separated in the X direction and magnetic pole parts 242 and 244 with coil 22 therebetween.

Coil 22 is a solenoid that is energized at the driving of electromagnetic actuator 10 to generate a magnetic field. Together with core 24 and movable member 40, coil 22 makes up a magnetic circuit (magnetic path) that attracts and moves movable member 40. Note that a driving signal from alternating current signal input section 120 (see FIG. 4) is input to coil 22 through half-wave rectification section 130 (see FIG. 4). For example, an alternating current driving signal is supplied to electromagnetic actuator 10 through half-wave rectification section 130 and thus power is supplied to coil 22 to drive electromagnetic actuator 10.

Core 24 includes core main body 241 around which coil 22 is wound, and magnetic pole parts 242 and 244 provided at both end portions of core main body 241 configured to energize coil 22 for excitation.

Core 24 may have any structure as long as it has a structure with a length with which both end portions become magnetic pole parts 242 and 244 through energization of coil 22. For example, core 24 of the present embodiment is formed in an H-shaped plate shape in plan view, while it may be formed in a straight-shaped (I-shaped) plate shape.

H-shaped core 24 has a shape in which the gap side surface is extended longer than the width of the core main body around which coil 22 is wound in the front-rear direction (Y direction) at both end portions of core main body 241 in comparison with an I-shaped core. Thus, with H-shaped core 24, the magnetic resistance can be reduced and the efficiency of the magnetic circuit can be improved in comparison with an I-shaped core. In addition, by only fitting bobbin 26 between the portions protruding in the Y direction from the both sides of core main body 241 in magnetic pole parts 242 and 244, the positioning of coil 22 at core 24 can be performed. Thus, in electromagnetic actuator 10, it is not necessary to additionally provide a member for positioning bobbin 26 with respect to core 24.

In core 24, magnetic pole parts 242 and 244 are respectively provided to protrude in the direction orthogonal to the winding axis of coil 22 at both end portions of plate-shaped core main body 241 around which coil 22 is wound.

Core 24 is a magnetic substance, and is formed of a silicon steel sheet, permalloy, ferrite or the like, for example. In addition, core 24 may be composed of an electromagnetic stainless-steel, a sintered material, a metal injection mold (MIM) material, a lamination steel sheet, electricity zinc plating steel sheet (SECC) or the like.

Magnetic pole parts 242 and 244 are protruded in the Y direction from the both openings of coil 22.

Magnetic pole parts 242 and 244 are excited through energization to coil 22, attracts and moves yoke 41 of movable member 40 separated in the vibration direction (Z direction). More specifically, with the generated magnetic flux, magnetic pole parts 242 and 244 attract attracted surface parts 46 and 47 of movable member 40 disposed to face each other with gap G therebetween.

Magnetic pole parts 242 and 244 are plate-shaped members extending in the Y direction as the direction perpendicular to core main body 241 extending in the X direction. Since magnetic pole parts 242 and 244 are long in the Y direction, the areas of opposite opposing surfaces 20a and 20b facing yoke 41 are large in comparison with the configuration in which it is formed at the both end portions of core main body 241.

In magnetic pole parts 242 and 244, fixation hole 28 is formed at a center portion in the Y direction, and it is fixed to base part 32 with screw 68 inserted to fixation hole 28.

Bobbin 26 is disposed to surround core main body 241 of core 24. Bobbin 26 is formed of a resin material, for example. In this manner, electrical insulation from other metal members (for example, core 24) can be ensured, and reliability as an electric circuit is improved. The use of a high-flow resin material improves moldability and allows bobbin 26 to have a thinner wall thickness while maintaining its strength. Note that bobbin 26 is formed in a cylindrical shape covering the periphery of core main body 241 by assembling divided members 26a and 26b to sandwich core main body 241. In addition, bobbin 26 is provided with the flange at the both end portions of the cylindrical shape, with which coil 22 is regulated to be located on the outer periphery of core main body 241.

Movable Member 40

Movable member 40 is disposed to face core assembly 20 with gap G in the direction orthogonal to the vibration direction (Z direction). Movable member 40 is provided such that it can move back and forth in the vibration direction with respect to core assembly 20.

Movable member 40 includes yoke 41 and includes movable member side fixing part 54 of resilient parts 50-1 and 50-2 fixed to yoke 41.

Through resilient part 50 (50-1, 50-2), movable member 40 is disposed such that it is movable in the approaching or separating direction (Z direction) with respect to bottom surface part 32b, in an approximately parallel manner with a space therebetween (standard suspended position).

Yoke 41 is a plate-shaped member composed of a magnetic substance such as an electromagnetic stainless-steel, a sintered material, a metal injection mold (MIM), a lamination steel sheet, and an electrogalvanized steel sheet (SECC). In the present embodiment, yoke 41 is formed by processing a SECC plate.

With resilient part 50 (50-1, 50-2) fixed to attracted surface parts 46 and 47 separated in the X direction, yoke 41 is suspended in an opposite manner with respect to core assembly 20 with gap G (see FIG. 7) therebetween in the vibration direction (Z direction).

Yoke 41 includes surface fixing part 44 for attaching vibration transmission part 2 (see FIG. 1), and attracted surface parts 46 and 47 disposed to face magnetic pole parts 242 and 244.

In the present embodiment, yoke 41 is formed in a rectangular frame shape surrounding opening 48 at the center portion with surface fixing part 44 and attracted surface parts 46 and 47.

Opening 48 faces coil 22. In the present embodiment, opening 48 is located directly above coil 22, and the shape of the opening of opening 48 is formed in a shape that allows for insertion of coil 22 of core assembly 20 when yoke 41 moves to bottom surface part 32*b* side. With yoke 41 with the configuration with opening 48, the thickness of the entire electromagnetic actuator can be reduced in comparison with the configuration with no opening 48.

In addition, coil 22 of core assembly 20 is positioned in opening 48, and thus yoke 41 is not disposed in the vicinity of coil 22, reduction of the conversion efficiency due to the leakage magnetic flux leaked from coil 22 can be suppressed, and high output can be achieved.

Surface fixing part 44 includes fixation surface 44*a* fixed to vibration transmission part 2. Fixation surface 44*a* is fixed to vibration transmission part 2 with a securing member such as a screw inserted to surface part fixation hole 42 at a position surrounding core assembly 20.

Attracted surface parts 46 and 47 are attracted by magnetic pole parts 242 and 244 magnetized at core assembly 20, and resilient part 50 (50-1, 50-2) is fixed thereto.

Resilient parts 50-1 and 50-2 are fixed to attracted surface parts 46 and 47, respectively in the state where movable member side fixing part 54 is stacked. Attracted surface parts 46 and 47 are provided with cutout part 49 for escape of the head of screw 64 of core assembly 20 at the time of movement to bottom surface part 32*b* side.

In this manner, even when movable member 40 moves to bottom surface part 32*b* side and attracted surface parts 46 and 47 come closer to magnetic pole parts 242 and 244, it does not make contact with screw 68 for fixing magnetic pole parts 242 and 244 to bottom surface part 32*b*, and accordingly the movable region of yoke 41 in the Z direction can be ensured.

Resilient Part 50 (50-1, 50-2)

Resilient part 50 (50-1, 50-2) movably supports movable member 40 with respect to fixing body 30. Resilient part 50 (50-1, 50-2) is configured in a plate shape. Resilient part 50 (50-1, 50-2) may not have a plate shape and may be an elastic body of any shape and any material as long as it supports movable member 40 driven in one direction in the vibration direction with respect to fixing body 30.

Resilient part 50 (50-1, 50-2) supports the top surface of movable member 40 at the same height as the top surface of fixing body 30 or in parallel to the top surface of fixing body 30 on the bottom surface side than the top surface of fixing body 30 (in the present embodiment, the top surface of core assembly 20). Note that resilient parts 50-1 and 50-2 have shapes that are symmetric (point symmetric or line-symmetric) about the center of movable member 40, and are, in the present embodiment, members formed in the same manner.

Resilient part 50 disposes yoke 41 in an approximately parallel and opposite manner with respect to magnetic pole parts 242 and 244 of core 24 of fixing body 30 with gap G therebetween. Resilient part 50 supports the bottom surface of movable member 40 at a position on the bottom surface part 32*b* side than the level at substantially the same level as the height level of the top surface of core assembly 20 in a manner movable in the vibration direction.

Resilient part 50 is a leaf spring including meandering elastic arm part 56 coupling fixing body side fixing part 52 and movable member side fixing part 54.

Resilient part 50 attaches movable member 40 with fixing body side fixing part 52 attached to the surface of attaching portion 32*a*, movable member side fixing part 54 attached to the surfaces of attracted surface parts 46 and 47 of yoke 41, and meandering elastic arm part 56 in parallel to bottom surface part 32*b*.

Fixing body side fixing part 52 is joined and fixed to be in surface contact with attaching portion 32*a* with screw 62, and movable member side fixing part 54 is joined and fixed to be in surface contact with attracted surface parts 46 and 47 with screw 64.

Meandering elastic arm part 56 is an arm part with a meandering part. With the meandering part, meandering elastic arm part 56 ensures a length that allows for deformation required for the vibration of movable member 40 at the surface orthogonal to the vibration direction (surface formed in the X direction and the Y direction) between fixing body side fixing part 52 and movable member side fixing part 54.

In the present embodiment, meandering elastic arm part 56 is extended and folded back in the opposing direction of fixing body side fixing part 52 and movable member side fixing part 54, and the end portions joined to fixing body side fixing part 52 and movable member side fixing part 54 are formed at positions shifted from each other in the Y direction. Meandering elastic arm part 56 is disposed at a point symmetric or line-symmetric position with respect to the center of movable member 40.

In this manner, movable member 40 is supported at the both sides by meandering elastic arm part 56 including a spring with a meandering shape, and thus the stress can be dispersed during the elastic deformation. That is, resilient part 50 can move movable member 40 in the vibration direction (Z direction) without tilting it with respect to core assembly 20, and can improve the reliability of the vibration state.

Each resilient part 50 includes at least two meandering elastic arm parts 56. In this manner, in comparison with the case with each includes one meandering elastic arm part 56, the stress is dispersed during the elastic deformation, the reliability can be improved, supporting balance for movable member 40 is increased, and the stability can be improved.

In the present embodiment, the leaf spring serving as resilient part 50 is composed of a magnetic substance. In addition, movable member side fixing part 54 of resilient part 50 is disposed at a position opposite to both end portions (magnetic pole parts 242 and 244) of the core in the coil-winding axis direction or above it, and functions as the magnetic path. In the present embodiment, movable member side fixing part 54 is fixed in a stacked state on the upper side of attracted surface parts 46 and 47.

Thickness H (see FIG. 7) of attracted surface parts 46 and 47 facing magnetic pole parts 242 and 244 of the core assembly can be increased as the thickness of the magnetic substance. Since the thickness of resilient part 50 is the same as the thickness of yoke 41, the cross-sectional area of the portion of the magnetic substance facing magnetic pole parts 242 and 244 can be doubled. In this manner, in comparison with the case where the leaf spring is the non-magnetic member, the magnetic circuit can be extended, the reduction of the property due to the magnetic saturation in the magnetic circuit can be reduced, and the output improvement can be improved.

Note that in electromagnetic actuator 10 of the present embodiment, a detection part that detects the pushing amount of movable member 40 by the user through vibration transmission part 2 fixed at surface fixing part 44 may be provided, and the vibration may be generated on the basis of the pushing amount and the input alternating current signal. For example, as the detection part that detects the pushing amount, a sensor that detects the deformation of resilient part 50 may be provided.

Figure 9:
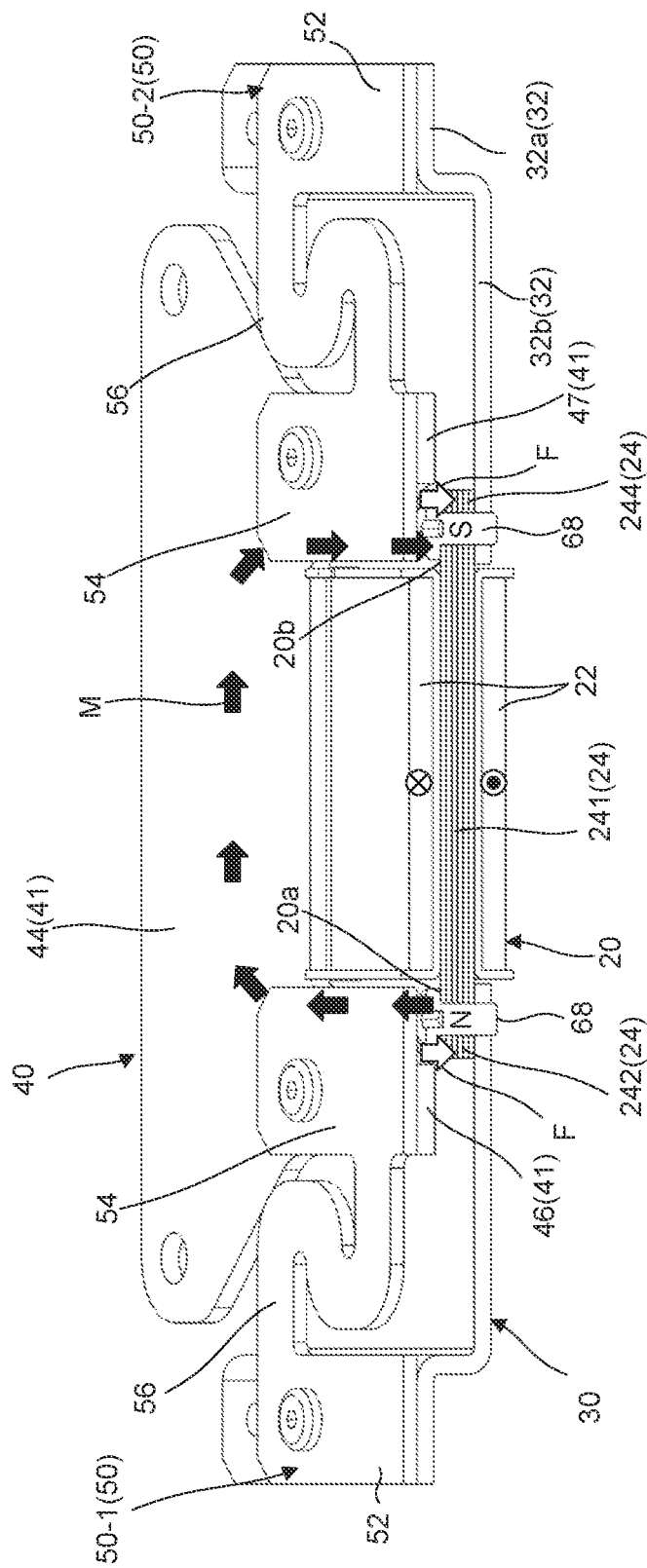
FIG. 9 is a diagram illustrating a configuration of a magnetic circuit of the same electromagnetic actuator.
Figure 10A:
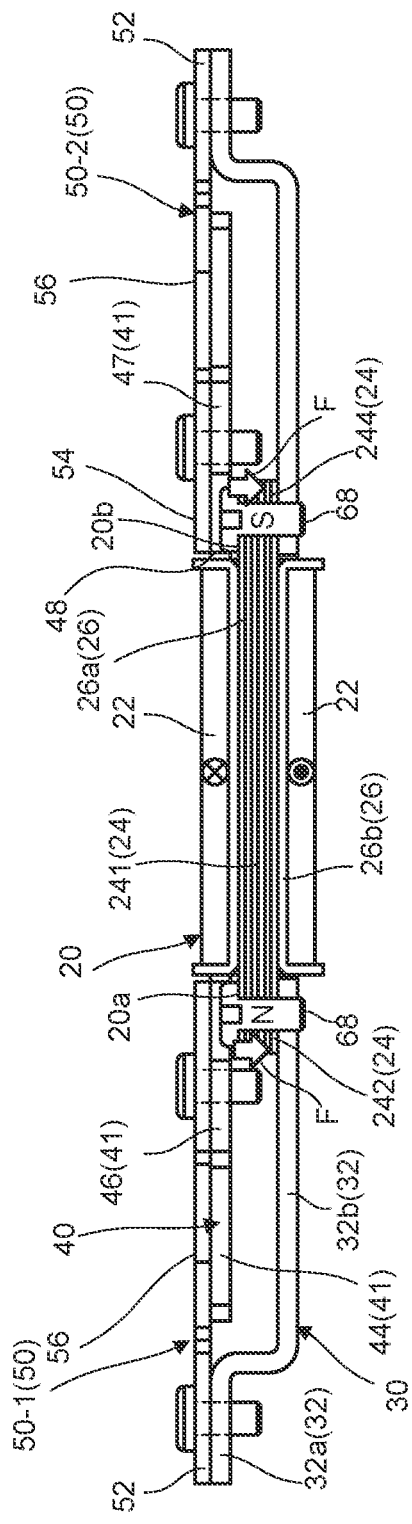
FIG. 10A is a diagram illustrating a state where a movable member is held at a position separated from a core assembly with a resilient part.
Figure 10B:
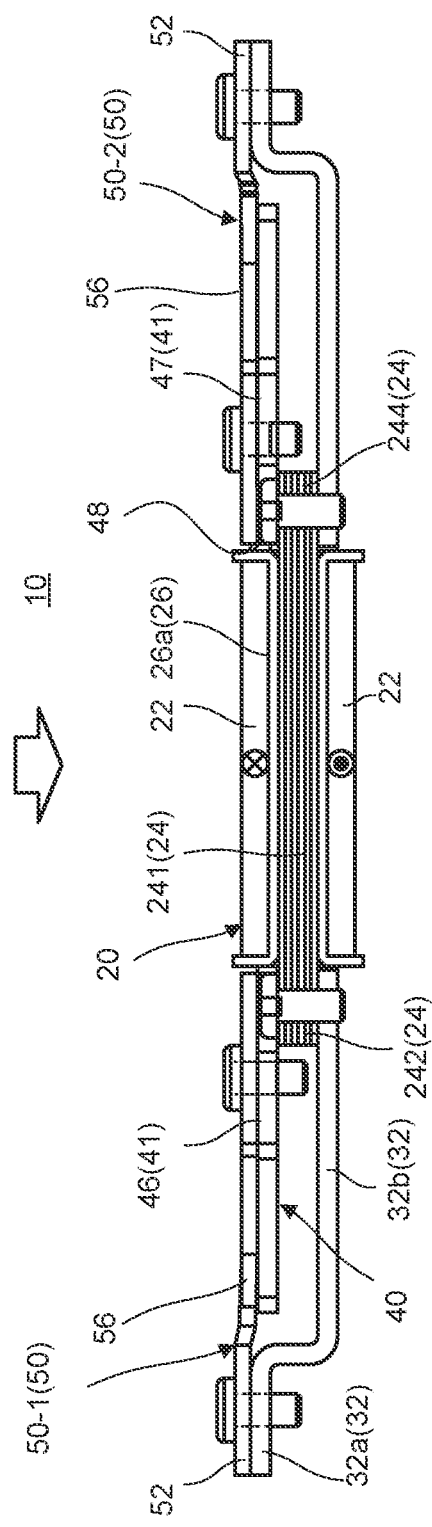
FIG. 10B is a diagram illustrating a movable member moved and attracted to the core assembly side with a magnetomotive force of a magnetic circuit.

FIG. 9 is a diagram illustrating a magnetic circuit of electromagnetic actuator 10. Note that FIG. 9 is a perspective view of electromagnetic actuator 10 taken along line A-A of FIG. 5, and in the magnetic circuit, a portion not illustrated in the drawing also has the same flow M of the magnetic flux as that of the illustrated portion. In addition, FIG. 10 is a diagram for describing an operation of electromagnetic actuator 10 and is a sectional view schematically illustrating a movement of movable member 40 by the magnetic circuit. Specifically, FIG. 10A is a diagram illustrating a state where movable member 40 is held by resilient part 50 at a position separated from core assembly 20, and FIG. 10B is a diagram illustrating movable member 40 attracted and moved to core assembly 20 side by a magnetomotive force of the magnetic circuit.

More specifically, when coil 22 is energized, core 24 is excited and a magnetic field is generated, and, the both end portions (magnetic pole parts 242 and 244) of core 24 become magnetic poles. For example, as illustrated in FIG. 9, in core 24, magnetic pole part 242 becomes the N pole, and magnetic pole part 244 becomes the S pole. Then, a magnetic circuit represented by magnetic flux flow M is formed between core assembly 20 and yoke 41. This magnetic flux flow M in the magnetic circuit flows from magnetic pole part 242 to attracted surface part 46 of yoke 41 on the opposite side, and reaches magnetic pole part 244 facing attracted surface part 47 through surface fixing part 44 of yoke 41 attracted surface part 47.

In the present embodiment, resilient part 50 is also a magnetic substance, and therefore the magnetic flux (represented by magnetic flux flow M) flown through attracted surface part 46 passes through attracted surface part 46 of yoke 41 and movable member side fixing part 54 of resilient part 50-1 overlapping it. Then, the magnetic flux (magnetic flux flow M) goes from movable member side fixing part 54 to movable member side fixing part 54 of resilient part 50-2, and, from both ends of attracted surface part 46 to both ends movable member side fixing part 54 of resilient part 50-2 and attracted surface part 47 through surface fixing part 44.

In this manner, by the principle of the electromagnetic solenoid, magnetic pole parts 242 and 244 of core assembly 20 generate attractive force F that attracts attracted surface parts 46 and 47 of yoke 41. Thus, attracted surface parts 46 and 47 of yoke 41 are attracted by both of magnetic pole parts 242 and 244 of core assembly 20, and coil 22 is inserted into opening 48 of yoke 41. Additionally, against the biasing force of resilient part 50, movable member 40 including yoke 41 moves in the F-direction (see FIG. 10A and FIG. 10B).

In addition, when the energization to coil 22 is released, the magnetic field is eliminated, attractive force F of movable member 40 by core assembly 20 is eliminated, and it is moved by the biasing force of resilient part 50 to the original position (moved in the −F-direction).

By repeating this operation, electromagnetic actuator 10 generates the vibration in the vibration direction (Z direction) by moving movable member 40 back and forth straight in the Z direction.

By moving movable member 40 back and forth straight, vibration transmission part 2 where movable member 40 is fixed is also displaced in the Z direction so as to follow movable member 40.

Core assembly 20 including core 24 around which coil 22 is wound is fixed to fixing body 30, and core assembly 20 is disposed in opening 48 of yoke 41 of movable member 40 supported by resilient part 50 movably in the Z direction with respect to fixing body 30.

In this manner, it is not necessary to dispose the members provided to the fixing body and the movable member for driving the movable member in the Z direction by generating magnetism in an overlapping manner in the Z direction (for example, it is not necessary to dispose the coil and the magnet in an opposite manner in the Z direction), and thus the thickness in the Z direction can be reduced as the electromagnetic actuator. In addition, by driving movable member 40 back and forth straight without using the magnet, vibration can be provided to vibration transmission part 2.

In this manner, the design is simplified with the simple supporting structure, space-saving can be achieved, and the thickness of electromagnetic actuator 10 can be reduced. In addition, since no magnet is used, cost can be reduced in comparison with vibration apparatuses (so-called actuators) with a configuration using magnets.

In the following, a driving principle of electromagnetic actuator 10 is briefly described. Electromagnetic actuator 10 can perform driving by generating a resonance phenomenon with supplied pulses by using equation of motion (1) and circuit equation (2) described below. In the present embodiment, driving is performed by inputting short pulses, but driving may be performed to generate desired vibrations without using short pulses.

Note that movable member 40 in electromagnetic actuator 10 performs back and forth movement on the basis of Expressions (1) and (2).

(Expression 1)

$$m\frac{d^2x(t)}{dt^2} = K_f i(t) - K_{sp}x(t) - D\frac{dx(t)}{dt} \quad [1]$$

m: mass [kg]
x(t): displacement [m]
$K_f$: thrust constant [N/A]
i(t): current [A]
$K_{sp}$: spring constant [N/m]
D: attenuation coefficient [N/(m/s)]

(Expression 2)

$$e(t) = Ri(t) + L\frac{di(t)}{dt} + K_e\frac{dx(t)}{dt} \quad [2]$$

e(t): voltage [V]
R: resistance [Ω]
L: inductance [H]
$K_c$: counter electromotive force constant [V/(rad/s)]

Specifically, mass m [Kg], displacement x(t) [m], thrust constant $K_f$ [N/A], current i(t) [A], spring constant $K_{sp}$ [N/m], attenuation coefficient D [N/(m/s)] and the like in electromagnetic actuator 10 may be appropriately changed as long as Expression (1) is satisfied. In addition, voltage e(t) [V], resistance R [Ω], inductance L [H], and counter electromotive force constant $K_e$ [V/(rad/s)] may be appropriately changed as long as Expression (2) is satisfied.

In this manner, electromagnetic actuator 10 is set by mass m of movable member 40, and spring constant $K_{sp}$ of the metal spring serving as resilient part 50 (the elastic body, which is the leaf spring in the present embodiment).

In addition, in electromagnetic actuator 10, screws 62 and 64 are used for the fixation of base part 32 and resilient part 50 and the fixation of resilient part 50 and movable member 40. In this manner, resilient part 50 that is required to be firmly fixed to fixing body 30 and movable member 40 for the purpose of driving movable member 40 can be mechanically firmly fixed in a reworkable state.

Control Section 1

Control section 1 controls the driving of electromagnetic actuator 10 that drives vibration transmission part 2 supported to elastically vibrate (see FIG. 1) in one direction in the vibration direction.

Control section 1 moves vibration transmission part 2 in the −Z direction with respect to base 3 where fixing body 30 is fixed by supplying a driving current to electromagnetic actuator 10 to attract movable member 40 to fixing body 30 side. The supply of the driving current to coil 22 is stopped to release movable member 40, and, with resilient part 50, movable member 40 is moved in a biased manner in the direction opposite to the attracted direction.

Control section 1 obtains a driving signal by performing half-wave rectification on an input alternating current signal, and outputs it to coil 22 of electromagnetic actuator 10.

Alternating current signal input section 120 illustrated in FIG. 4 outputs the input alternating current signal to half-wave rectification section 130. To alternating current signal input section 120, for example, an audio source is input, and alternating current signal input section 120 outputs the input audio source alternating current signal to half-wave rectification section 130.

Half-wave rectification section 130 is disposed between alternating current signal input section 120 and electromagnetic actuator 10. Half-wave rectification section 130 deletes the half-wave of the alternating current signal input through alternating current signal input section 120, i.e., performs half-wave rectification on the sine wave of the alternating current signal, and outputs it as a driving signal to coil 22 of electromagnetic actuator 10. In this manner, electromagnetic actuator 10 drives movable member 40 in synchronization with the input of the audio source input to sensory vibration generation apparatus 100. More specifically, in electromagnetic actuator 10, with the half-wave rectified driving signal received from half-wave rectification section 130, movable member 40 moves in one direction, or the −Z direction in this case, with respect to fixing body 30, and then moves in the direction opposite to the one direction, i.e., the Z direction, with the returning force (restoration force) of resilient part 50.

With this movement of movable member 40, it is possible to provide the user with the vibration in synchronization with the input of the audio source input to sensory vibration generation apparatus 100 through vibration transmission part 2 (see FIGS. 1 and 2) so as to make the user feel it.

Note that the driving signal output by half-wave rectification section 130 may be amplified in accordance with the alternating current signal input from alternating current signal input section 120 and output to electromagnetic actuator 10. Half-wave rectification section 130 may be configured with a rectifier circuit using a rectification diode or the like, for example.

In the present embodiment, as illustrated in FIG. 3, half-wave rectification section 130 is mounted at bottom surface part 32b of electromagnetic actuator 10, but this is not limitative. For example, as illustrated in FIG. 11, half-wave rectification section 130 may not be mounted in electromagnetic actuator 10, and may be mounted as circuit section 140 together with alternating current signal input section 120.

Figure 11:
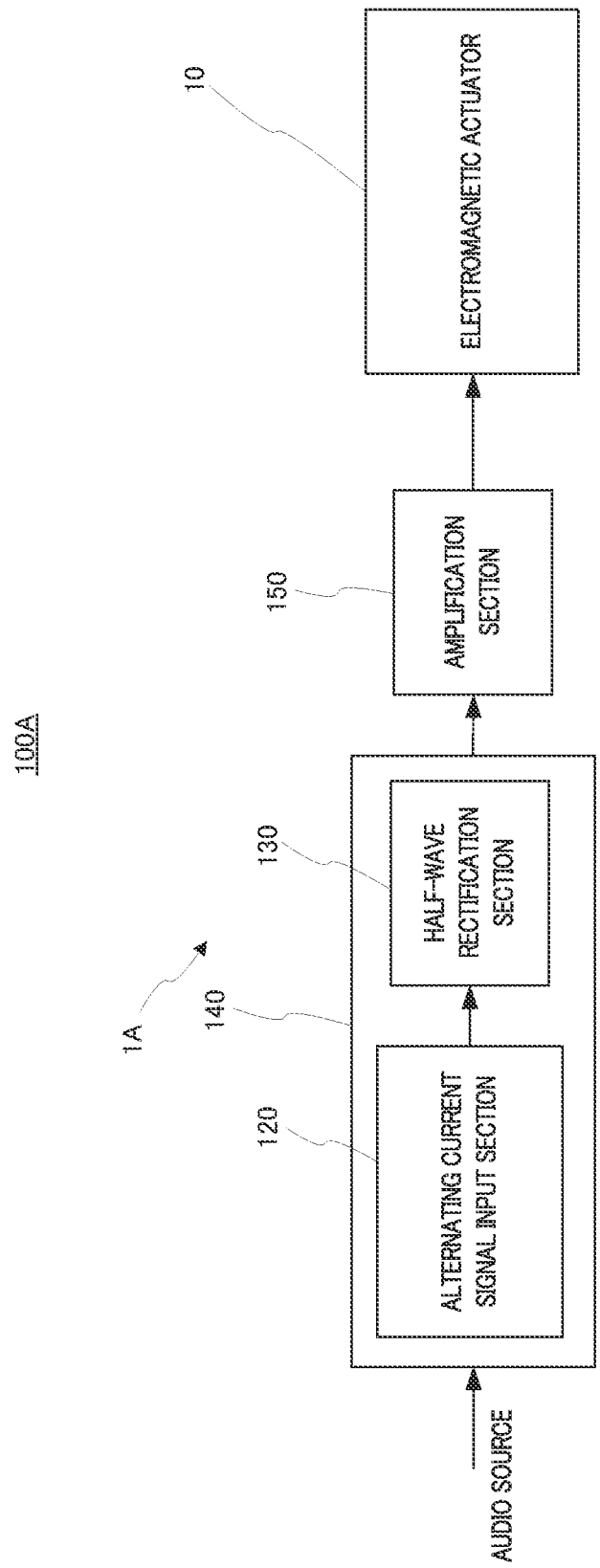
FIG. 11 is a block diagram illustrating a modification of a configuration of a main part of the same sensory vibration generation apparatus.

In sensory vibration generation apparatus 100A illustrated in FIG. 11, in circuit section 140 provided in control section 1A, half-wave rectification of the alternating current signal of the audio source input to alternating current signal input section 120 is performed at half-wave rectification section 130 and it is amplified at amplification section 150, and then it is input to electromagnetic actuator 10. In this manner, electromagnetic actuator 10 can provide the user with vibration through vibration transmission part 2 to make the user feel it by driving movable member 40 in synchronization with the input of the audio source input to alternating current signal input section 120.

FIG. 12 to FIG. 16 are diagrams for describing Variations 1 to 5 of the half-wave rectification section of the sensory vibration generation apparatus according to the embodiment of the present invention.

Variation 1

Figure 12A:
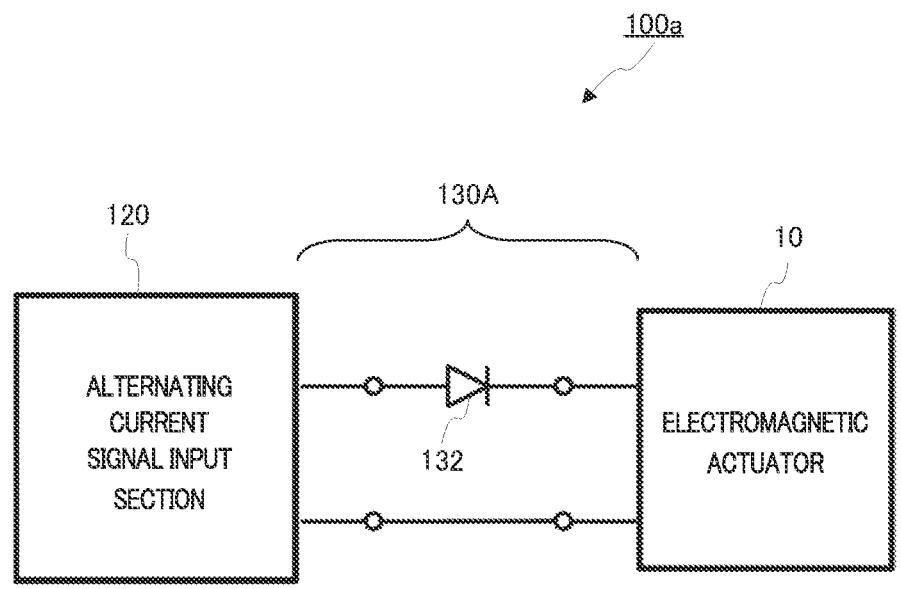
FIG. 12A and FIG. 12B are diagrams for describing Variation 1 of the half-wave rectification section of the sensory vibration generation apparatus according to the embodiment of the present invention.
Figure 12B:
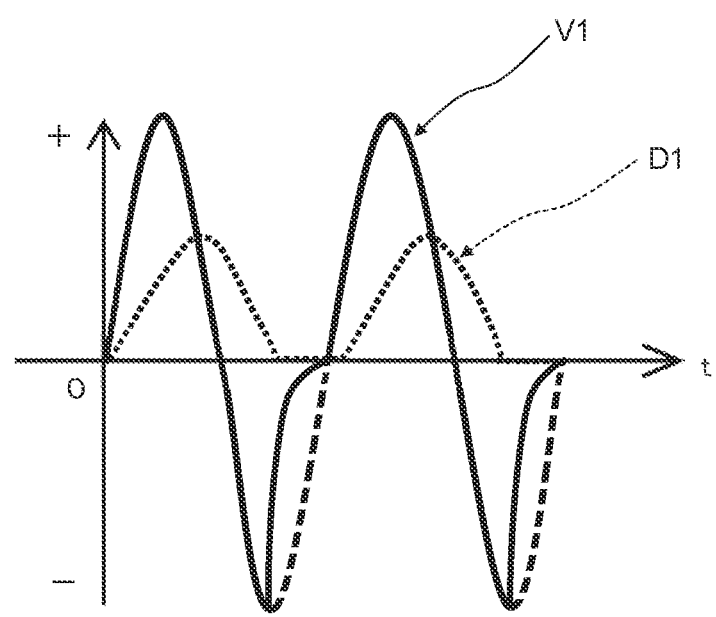

FIG. 12 is a diagram for describing Variation 1 of the half-wave rectification section of the sensory vibration generation apparatus according to the embodiment of the present invention. FIG. 12A illustrates a configuration of Variation 1, and FIG. 12B is a diagram illustrating a driving current input to electromagnetic actuator 10 through half-wave rectification section 130A.

Sensory vibration generation apparatus 100a illustrated in FIG. 12A includes as half-wave rectification section 130A provided between alternating current signal input section 120 and electromagnetic actuator 10, a rectifier circuit in which rectification diode 132 is inserted in the forward direction. With the half-wave rectifier circuit as half-wave rectification section 130A illustrated in FIG. 12A, supply voltage V1 to electromagnetic actuator 10 illustrated in FIG. 12B and supply current D1 to electromagnetic actuator 10 result, and the vibration corresponding to the period of input alternating current signal is generated.

In this manner, with rectification diode 132 used, the vibration corresponding to the frequency of the input alternating current signal can be generated in a cost-effective manner. In the rectifier circuit of Variation 1, rectification diode 132 is inserted between alternating current signal input section 120 and electromagnetic actuator 10 in the forward direction, and thus the above-described effects can be achieved with a simple configuration.

Variation 2

Figure 13A:
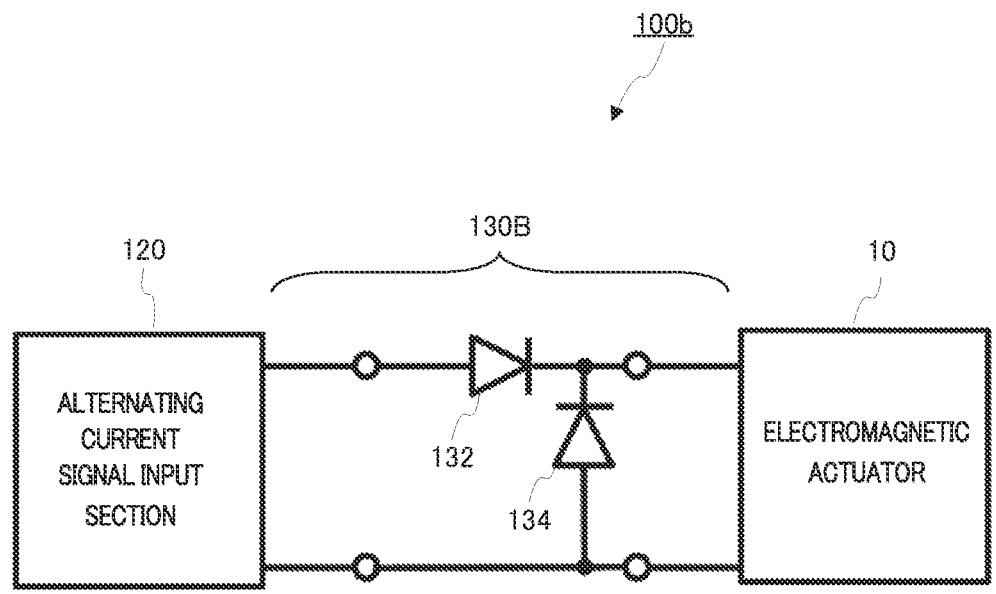
FIG. 13A and FIG. 13B are diagrams for describing Variation 2 of the half-wave rectification section of the sensory vibration generation apparatus according to the embodiment of the present invention.
Figure 13B:
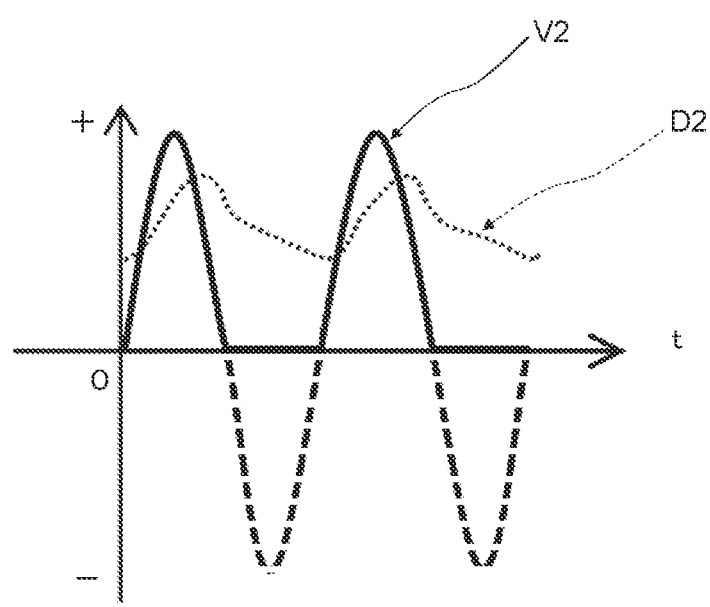

FIG. 13 is a diagram for describing Variation 2 of the half-wave rectification section of the sensory vibration generation apparatus according to the embodiment of the present invention. FIG. 13A illustrates a configuration of the half-wave rectification section of Variation 2, and FIG. 13B is a diagram illustrating a driving current input to electromagnetic actuator 10 through half-wave rectification section 130B.

Sensory vibration generation apparatus 100b illustrated in FIG. 13A includes as half-wave rectification section 130B between alternating current signal input section 120 and electromagnetic actuator 10, a half-wave rectification protecting circuit including rectification diode 132 and free wheel diode 134.

Half-wave rectification section 130B inserts rectification diode 132 (includes rectification diode 132) in the forward direction between alternating current signal input section 120 and electromagnetic actuator 10. Additionally, half-wave rectification section 130B inserts free wheel diode 134 in parallel with electromagnetic actuator 10 between the terminals of electromagnetic actuator 10.

With the half-wave rectification protecting circuit serving as half-wave rectification section 130B illustrated in FIG. 13A, supply voltage V2 to electromagnetic actuator 10 and supply current D2 electromagnetic actuator 10 illustrated in FIG. 13B result, and the vibration in synchronization with the input of the audio source is generated.

In this manner, free wheel diode 134 functions as the protecting circuit of rectification diode 132, and, even when a counter electromotive force is generated in electromagnetic actuator 10, the high voltage is not applied to the rectification diode, and it is not necessary to replace the rectification diode due to damages.

Variation 3

Figure 14A:
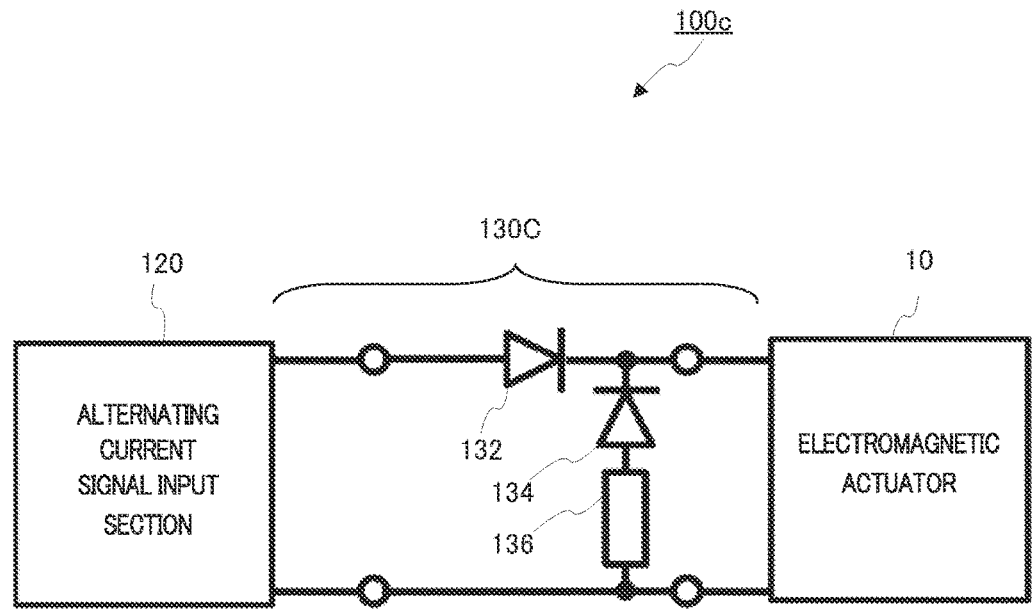
FIG. 14A and FIG. 14B are diagrams for describing Variation 3 of the half-wave rectification section of the sensory vibration generation apparatus according to the embodiment of the present invention.
Figure 14B:
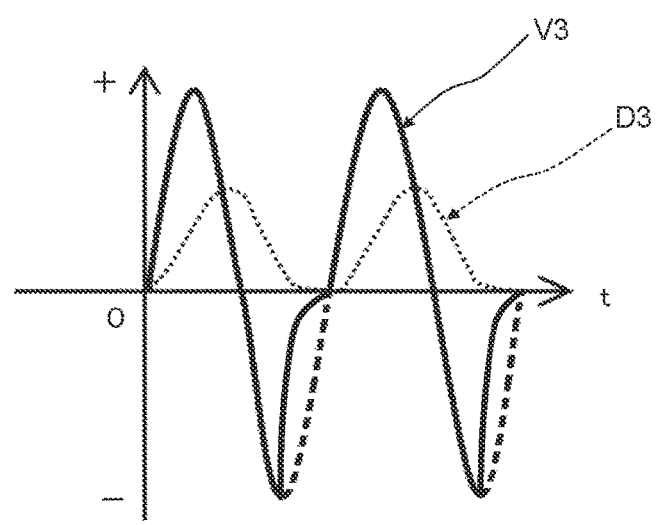

FIG. 14 is a diagram for describing Variation 3 of the half-wave rectification section of the sensory vibration generation apparatus according to the embodiment of the present invention. FIG. 14A illustrates a configuration of the half-wave rectification section of Variation 3, and FIG. 14B is a diagram illustrating a driving current input to electromagnetic actuator 10 through half-wave rectification section 130C.

Sensory vibration generation apparatus 100c illustrated in FIG. 14A includes, as half-wave rectification section 130C between alternating current signal input section 120 and electromagnetic actuator 10, a half-wave rectification protecting circuit including rectification diode 132, free wheel diode 134 and resistance 136.

Half-wave rectification section 130C includes rectification diode 132 inserted in the forward direction between alternating current signal input section 120 and electromagnetic actuator 10. In addition, in half-wave rectification section 130C, resistance 136 is connect to free wheel diode 134 and inserted in parallel with electromagnetic actuator 10 between terminals of electromagnetic actuator 10. Free wheel diode 134 and resistance 136 function as the protecting circuit of rectification diode 132.

With the half-wave rectification protecting circuit serving as half-wave rectification section 130C illustrated in FIG. 14A, the same supply voltage and supply current as supply voltage V3 to electromagnetic actuator 10 and supply current D3 to electromagnetic actuator 10 illustrated in FIG. 14B result, and the vibration corresponding to the input alternating current signal is generated.

Half-wave rectification section 130C includes free wheel diode 134 and resistance 136 connected to free wheel diode 134 as the protecting circuit of rectification diode 132. With half-wave rectification section 130C, with resistance 136, degradation of the reproducibility of the sensory vibration can be prevented by generating sharp sensory vibrations by suppressing the flow of the current in a smooth manner unlike the circuit that protects rectification diode 132 with only free wheel diode 134. In addition, even in the case where the current flows at all times, resistance 136 can prevent the temperature rise of the device due to Joule heat.

Figure 15:
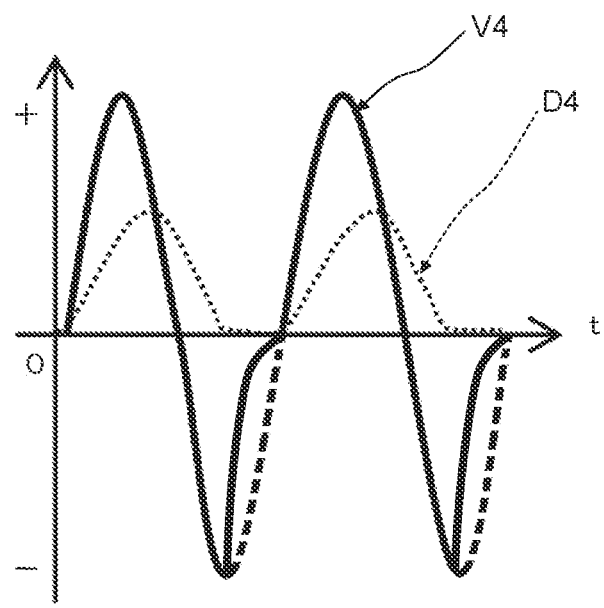
FIG. 15 is a diagram illustrating a waveform output by Variation 4 of the half-wave rectification section of the sensory vibration generation apparatus according to the embodiment of the present invention.

FIG. 15 is a diagram illustrating a current that is supplied to electromagnetic actuator 10 in the case where the resistance value of resistance 136 is increased in a configuration of sensory vibration generation apparatus 100c. Note that voltage V4 input to electromagnetic actuator 10 is the same as voltage V3 illustrated in FIG. 14B. As illustrated in FIG. 15, by increasing the resistance value of resistance 136 than the configuration of FIG. 14A, the rising of driving current D4 is sharped, and electromagnetic actuator 10 can generate a sharp vibration corresponding to the input of the alternating current signal of the audio source.

Variation 4

Figure 16:
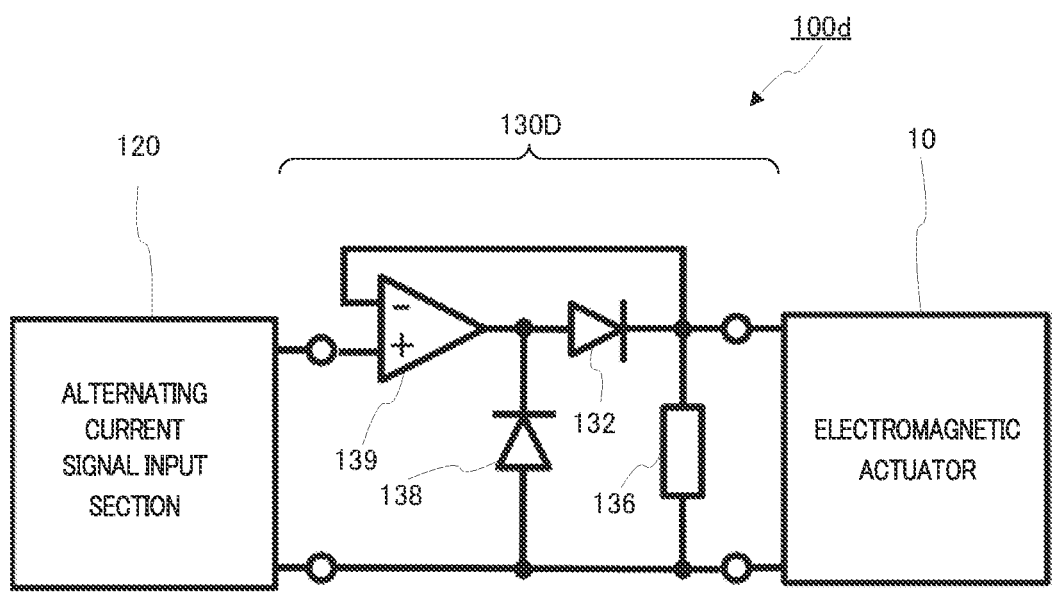
FIG. 16 is a diagram for describing Variation 5 of the half-wave rectification section of the sensory vibration generation apparatus according to the embodiment of the present invention.

FIG. 16 is a diagram for describing Variation 4 of the half-wave rectification section of the sensory vibration generation apparatus according to the embodiment of the present invention, and is a diagram illustrating a configuration of a half-wave rectification section is Variation 4.

Sensory vibration generation apparatus 100d illustrated in FIG. 16 includes half-wave rectification section 130D between alternating current signal input section 120 and electromagnetic actuator 10. Half-wave rectification section 130D includes rectification diodes 132 and 138, free wheel diode 134, resistance 136, and operational amplifier 139 serving as the amplification section (computation amplifier).

In half-wave rectification section 130D, operational amplifier 139 and rectification diode 132 connected on the output side of operational amplifier 139 are inserted in the forward direction between alternating current signal input section 120 and electromagnetic actuator 10. In addition, in half-wave rectification section 130C, resistance 136 is inserted in parallel with electromagnetic actuator 10 between terminals of electromagnetic actuator 10. Further, another rectification diode 138 connected between operational amplifier 139 and rectification diode 132 is inserted in parallel with electromagnetic actuator 10. In this manner, half-wave rectification section 130C is composed of an operational amplifier circuit including operational amplifier 139.

Since operational amplifier 139 is used, half-wave rectification section 130D can achieve a so-called ideal diode and can prevent the voltage drop in the forward direction in the configuration using rectification diode 132. That is, even a minute voltage component can be reproduced, i.e., the driving current corresponding to the minute voltage component can be generated, and supplied to electromagnetic actuator 10 so as to generate the vibration in synchronization with the input of the audio source.

In this manner, with sensory vibration generation apparatuses 100 and 100a to 100d, the output can be increased through efficient driving even with a small-sized product. That is, by using the electromagnetic actuator, it is possible to provide the user with vibration through vibration transmission part 2 and make the user feel it while achieving cost reduction and thickness reduction.

Note that in the present embodiment, half-wave rectification section 130 is mounted in electromagnetic actuator 10. By mounting half-wave rectification section 130 in electromagnetic actuator 10 in this manner, no burden is placed on circuit design and no dedicated circuit configuration is required, in comparison with the case where half-wave rectification section 130 is provided on alternating current signal input section 120 side (see, for example, FIG. 11). That is, circuits other than the sound source circuit that generates sound are not required, and an alternating current signal representing the audio source can be input as it is to the actuator (rectification section). Thus, the use convenience can be improved.

In addition, while it is preferable that a plurality of resilient parts 50 is fixed at a position that is symmetric about the center of movable member 40 in electromagnetic actuator 10, it is also possible that one resilient part 50 supports movable member 40 such that it can vibrate with respect to fixing body 30 as described above. Resilient part 50 may include at least two arm parts coupling movable member 40 and fixing body 30 and including meandering elastic arm part 56. Resilient part 50 may be composed of a magnetic substance. In this case, movable member side fixing part 54 of resilient part 50 is disposed in the winding axis direction of coil 22 or in the direction orthogonal to the winding axis direction with respect to both end portions of core 24, and forms the magnetic path together with core 24 when coil 22 is energized.

In addition, in the configuration of electromagnetic actuator 10, a rivet may be used in place of screws 62 and 64, 68 for the fixation of base part 32 and resilient part 50, and the fixation of resilient part 50 and movable member 40. Each rivet is composed of a head and a screwless body. The rivet is inserted into a member with a hole in it, and the opposite end is clamped and plastically deformed to join the members with holes in them. For example, a press machine or special tool may be used to perform the clamping.

Figure 17:
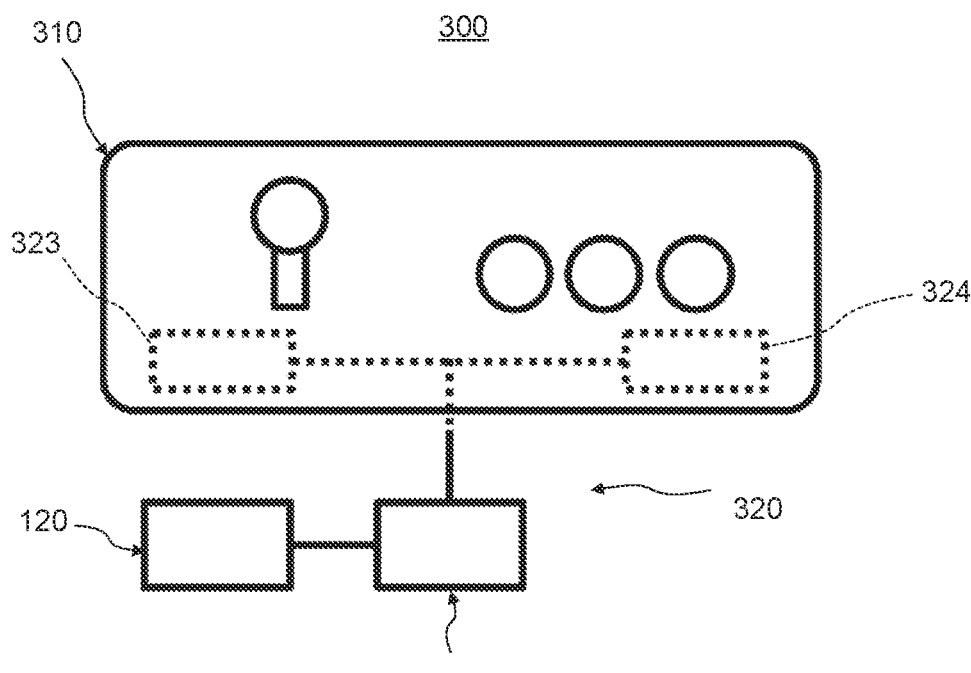
FIG. 17 is a diagram illustrating an example of a sensory vibration producing apparatus to which the sensory vibration generation apparatus according to the embodiment of the present invention is applied.
Figure 18:
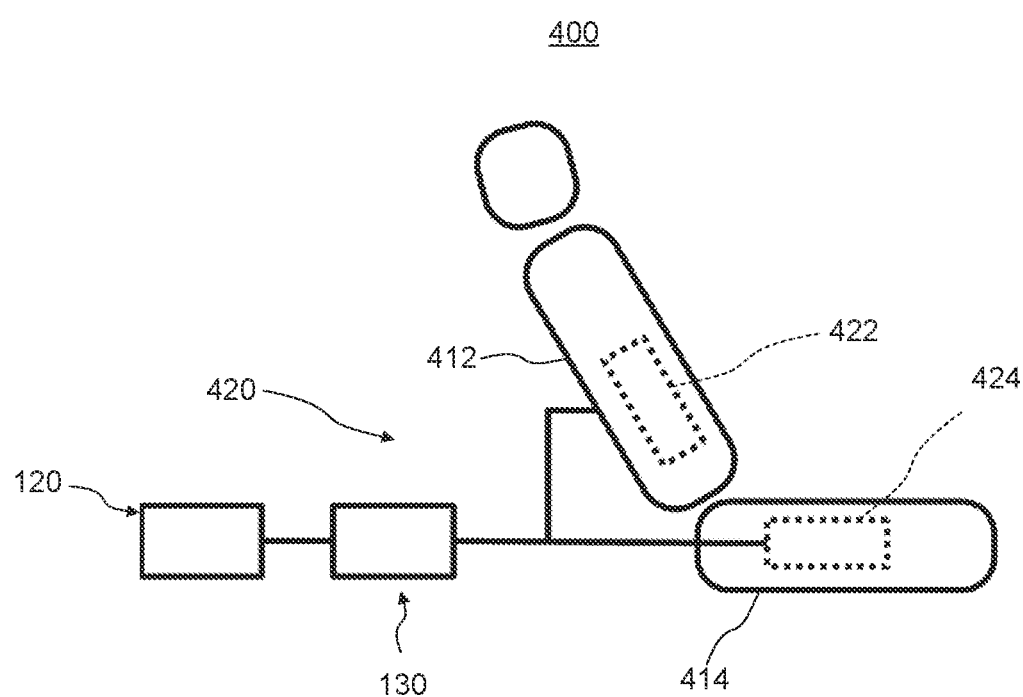
FIG. 18 is a diagram illustrating an example of a sensory vibration producing apparatus to which the sensory vibration generation apparatus according to the embodiment of the present invention is applied.

FIG. 17 and FIG. 18 illustrate an example of a mounting state of sensory vibration generation apparatus 100. FIG. 17 and FIG. 18 are diagrams illustrating an example in which sensory vibration generation apparatuses 320 and 420 with the same configuration as sensory vibration generation apparatus 100 are mounted in game controller 300 and game seat 400. Note that the configuration of game seat 400 may be configured as an apparatus touched by the user such as a sensory simulator (such as a seat of a sensory simulator) and a listening seat.

Game controller 300 is connected to the game machine main body through wireless communication, and used by the user grasping and grabbing it, for example. Here, game controller 300 includes rectangular plate-shaped main body part 310, and the user operates it by grasping the left and right sides of game controller 300 with both hands. Note that main body part 310 functions as a vibration transmission part.

Game controller 300 can notify the user during a game by causing the user to experience vibrations in response to AC signals indicating command notifications, music, voice, etc. from the game machine itself. Although not illustrated in the drawing, game controller 300 is equipped with functions other than command notification and vibration in response to music or voice, such as an input control unit for the game machine.

Game seat 400 is, for example, a seat connected to the main unit of a game machine and on which the user sits when playing a game. Game seat 400 can make the user feel the sound (music, acoustics) emitted in accordance with the game content through vibration, and achieves each function of the game seat 400 (e.g., functions that give a sense of operation and realism).

Each of game controller 300 and game seat 400 illustrated in FIG. 17 and FIG. 18 includes alternating current signal input section 120, half-wave rectification section 130 and electromagnetic actuators 323, 324, 424 and 422 (which may be components similar to the configuration of electromagnetic actuator 10, for example) serving as the driving section. In the present embodiment, a plurality of electromagnetic actuators 323, 324, 424 and 422 are mounted in each of game controller 300 and game seat 400, but the number of mounted actuators is not limited as long as one or more actuators are mounted.

Note that in game controller 300, it is preferable that electromagnetic actuators 323 and 324 of sensory vibration generation apparatus 320 be mounted such that the vibration direction is orthogonal to the surface touched by the fingertip, finger ball, palm and the like of the operating user, or the surface where the operation section is provided.

In addition, in the case of game seat 400, for example, it is preferable that electromagnetic actuator 424 be mounted in seat part 414 so as to vibrate the seat surface, and that electromagnetic actuator 422 be mounted in backrest part 412 such that the backrest surface can be vibrated. Each of seat part 414 and backrest part 412 functions as a vibration transmission part.

In this manner, in the case where there is the audio source of the game sound and the music during the game and the like, the audio source is input to alternating current signal input section 120, and an alternating current signal as the audio source is output to half-wave rectification section 130. Half-wave rectification section 130 performs half-wave rectification on the input alternating current signal, and outputs it to each of electromagnetic actuators 323, 324, 424 and 422 as a driving signal.

In this manner, each of electromagnetic actuators 323, 324, 424 and 422 can generate a vibration in synchronization with the input of the alternating current signal representing the input audio source (sound, acoustic), and make the user feel it.

The embodiments of the present invention are described above. The above description is an illustration of a suitable embodiment of the invention, and the scope of the invention is not limited thereto. In other words, the above description of the configuration of the device and the shape of each part is an example, and it is clear that various changes and additions to these examples are possible within the scope of the invention.

In the present embodiment, the driving direction of the electromagnetic actuator driven and controlled by control section 1 is the Z direction, but this is not limitative. The above-described effects of efficient driving, enhancement of the vibration and the like can be obtained also in the direction parallel to the contact surface of the user, or more specifically, the X direction or the Y direction.

This application is entitled to and claims the benefit of Japanese Patent Application No. 2019-217040 filed on Nov. 29, 2019, the disclosure each of which including the specification, drawings and abstract is incorporated herein by reference in its entirety.

INDUSTRIAL APPLICABILITY

By using the electromagnetic actuator, the electromagnetic actuator according to the present invention can achieve cost reduction and thickness reduction and achieve effects of efficiently generating a thrust suitable for sensory vibration for the user, and it is useful for game controllers, game seats, listening seats and the like, for example.

REFERENCE SIGNS LIST

1 Control section
2 Vibration transmission part
2a Surface
10, 323, 324, 424, 422 Electromagnetic actuator
20 Core assembly
22 Coil
24 Core
26 Bobbin
30 Fixing body
32 Base part 40 Movable member
50 Resilient part
100, 100A, 100a, 100b, 100c, 100d, 320, 420 Sensory vibration generation apparatus
120 Alternating current signal input section
130, 130A, 130B, 130C, 130D Half-wave rectification section
132, 138 Rectification diode
134 Free wheel diode
136 Resistance
139 Operational amplifier
140 Circuit section
150 Amplification section
200 Vibration producing apparatus (Sensory vibration producing apparatus)
300 Game controller
310 Main body part
400 Game seat
412 Backrest part
414 Seat part

What is claimed is:

1. A sensory vibration generation apparatus comprising:
an electromagnetic actuator that includes:
   a core assembly in which a coil is wound around a core,
   a yoke having a shape to surround the coil and disposed to face the core assembly, and
   an elastic part connecting between the core assembly and the yoke, wherein the electromagnetic actuator vibrates in one direction of a vibration direction with an input driving signal to the coil;
an alternating current signal input section to which an alternating current signal is input; and
a rectification section configured to acquire the driving signal by performing half-wave rectification on the alternating current signal and output the driving signal to the electromagnetic actuator.

2. The sensory vibration generation apparatus according to claim 1, wherein the rectification section is a rectifier circuit provided between the alternating current signal input section and the electromagnetic actuator, and including a rectification diode configured to connect the alternating current signal input section and the electromagnetic actuator.

3. The sensory vibration generation apparatus according to claim 2, wherein the rectification diode is inserted in a forward direction in the rectifier circuit.

4. The sensory vibration generation apparatus according to claim 3, wherein the rectifier circuit includes a computation amplifier connected to the rectification diode and configured to amplify the alternating current signal input to the rectification diode.

5. The sensory vibration generation apparatus according to claim 2, wherein the rectification section is a rectification protecting circuit including a free wheel diode connected to the rectification diode in parallel with the rectification diode.

6. The sensory vibration generation apparatus according to claim 5, wherein the rectification protecting circuit includes a resistance connected to the free wheel diode.

7. The sensory vibration generation apparatus according to claim 1, wherein the rectification section is mounted in the electromagnetic actuator.

8. A sensory vibration producing apparatus comprising:
the sensory vibration generation apparatus according to claim 1; and
a vibration transmission part configured to be vibrated by the sensory vibration generation apparatus to transmit a vibration to a user.

* * * * *